(12) United States Patent
Enbuske et al.

(10) Patent No.: US 12,289,769 B2
(45) Date of Patent: Apr. 29, 2025

(54) BACK-OFF FOR 2-STEP RA PROCEDURE

(71) Applicant: Telefonaktiebolaget LM Ericsson (publ), Stockholm (SE)

(72) Inventors: Henrik Enbuske, Stockholm (SE); Jan Christoffersson, Luleå (SE); Mats Folke, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 600 days.

(21) Appl. No.: 17/608,019

(22) PCT Filed: May 1, 2020

(86) PCT No.: PCT/IB2020/054144
§ 371 (c)(1),
(2) Date: Nov. 1, 2021

(87) PCT Pub. No.: WO2020/222191
PCT Pub. Date: Nov. 5, 2020

(65) Prior Publication Data
US 2022/0369373 A1   Nov. 17, 2022

Related U.S. Application Data

(60) Provisional application No. 62/842,285, filed on May 2, 2019.

(51) Int. Cl.
*H04W 74/08* (2024.01)
*H04W 74/0833* (2024.01)

(52) U.S. Cl.
CPC ............... *H04W 74/0833* (2013.01)

(58) Field of Classification Search
CPC ..... H04W 76/11; H04W 72/23; H04W 76/18; H04W 74/0833; H04W 72/0446;
(Continued)

(56) References Cited

U.S. PATENT DOCUMENTS

2015/0173074 A1   6/2015  Zhao et al.
2015/0373680 A1   12/2015 Park et al.
(Continued)

FOREIGN PATENT DOCUMENTS

RU    2683977 C1    4/2019

OTHER PUBLICATIONS

Unknown, Author , "2 Step RA: MAC PDU Format for MsgB", Samsung, 3GPP TSG-RAN2 105bis R2-1903115, Xian, China, Apr. 8-Apr. 12, 2019, 1-3.
(Continued)

*Primary Examiner* — Awet Haile
(74) *Attorney, Agent, or Firm* — Murphy, Bilak & Homiller, PLLC

(57) ABSTRACT

A wireless device configured to perform a 2-step random access, RA, procedure transmits (802) a message according to the 2-step RA procedure, the message comprising a first random access preamble. The wireless device receives (804), during a RA response window following the transmitting of the message, a Medium Access Control, MAC, subheader. Using one or more bits or fields included in the received subheader, the wireless device determines (806) that it should take action according to any one of the following: backing off, according to a back-off parameter, for a subsequent RA attempt according to the 2-step RA procedure; falling back to a 4-step RA procedure by transmitting a new RA preamble; and falling back to a 4-step RA procedure after backing off according to a back-off parameter, by transmitting a new random access preamble after the back-off.

26 Claims, 13 Drawing Sheets

(58) Field of Classification Search
CPC ......... H04W 72/0453; H04W 74/0816; H04W 74/0841; H04W 74/085; H04W 74/002; H04L 1/189
See application file for complete search history.

(56) References Cited

U.S. PATENT DOCUMENTS

| | | | |
|---|---|---|---|
| 2018/0270869 A1 | 9/2018 | Tsai | |
| 2018/0279376 A1 | 9/2018 | Dinan et al. | |
| 2020/0329504 A1* | 10/2020 | Kunt | H04W 74/0833 |
| 2020/0404711 A1* | 12/2020 | Zhao | H04W 80/02 |
| 2022/0070938 A1* | 3/2022 | Wu | H04L 1/189 |
| 2022/0141884 A1* | 5/2022 | Lee | H04W 72/23 370/329 |
| 2022/0312484 A1* | 9/2022 | Murray | H04W 74/0833 |

OTHER PUBLICATIONS

Unknown, Author, "Consideration on fall back procedure from 2-step RACH to 4-step RACH", Sony, 3GPP TSG RAN WG2 Meeting #105bis R2-1904210, Xi'an, China, Apr. 8-Apr. 12, 2019, 1-5.

3GPP, "3rd Generation Partnership Project; Technical Specification Group Radio Access Network; NR; Medium Access Control (MAC) protocol specification (Release 15)", 3GPP TS 38.321 V15.5.0, Mar. 2019, 1-78.

Ericsson, "Back-off for 2-step RA", 3GPP TSG-RAN WG2 #106, Tdoc R2-1906955, Reno, US, May 13-17, 2019, 1-6.

Unknown, Author, "Fall back mechanisms for 2-step RACH", 3GPP TSG-RAN WG2 Meeting #105bis, R2-1903294, Xi'an, China, Apr. 6-12, 2019, 1-3.

Unknown, Author, "Fall back procedure from 2-step RACH to 4-step RACH", 3GPP TSG-RAN WG2 Meeting #105bis, R2-1903715, Xian, China, Apr. 8-12, 2019, 1-2.

Unknown, Author, "Fallback for 2-step RA", 3GPP TSG-RAN WG2 #105bis, TDoc R2-1903427, Xi'an, China, Apr. 8-Apr. 12, 2019, 1-3.

Unknown, Author, "General consideration on the content of MsgB", 3GPP TSG-WG2 Meeting #105-bis, R2-1903548, China, Xian, Apr. 8-12, 2019, 1-9.

Unknown, Author, "MsgB design", 3GPP TSG-RAN WG2 Meeting #105bis, R2-1903716, Xian, China, Apr. 8-12, 2019, 1-3.

* cited by examiner

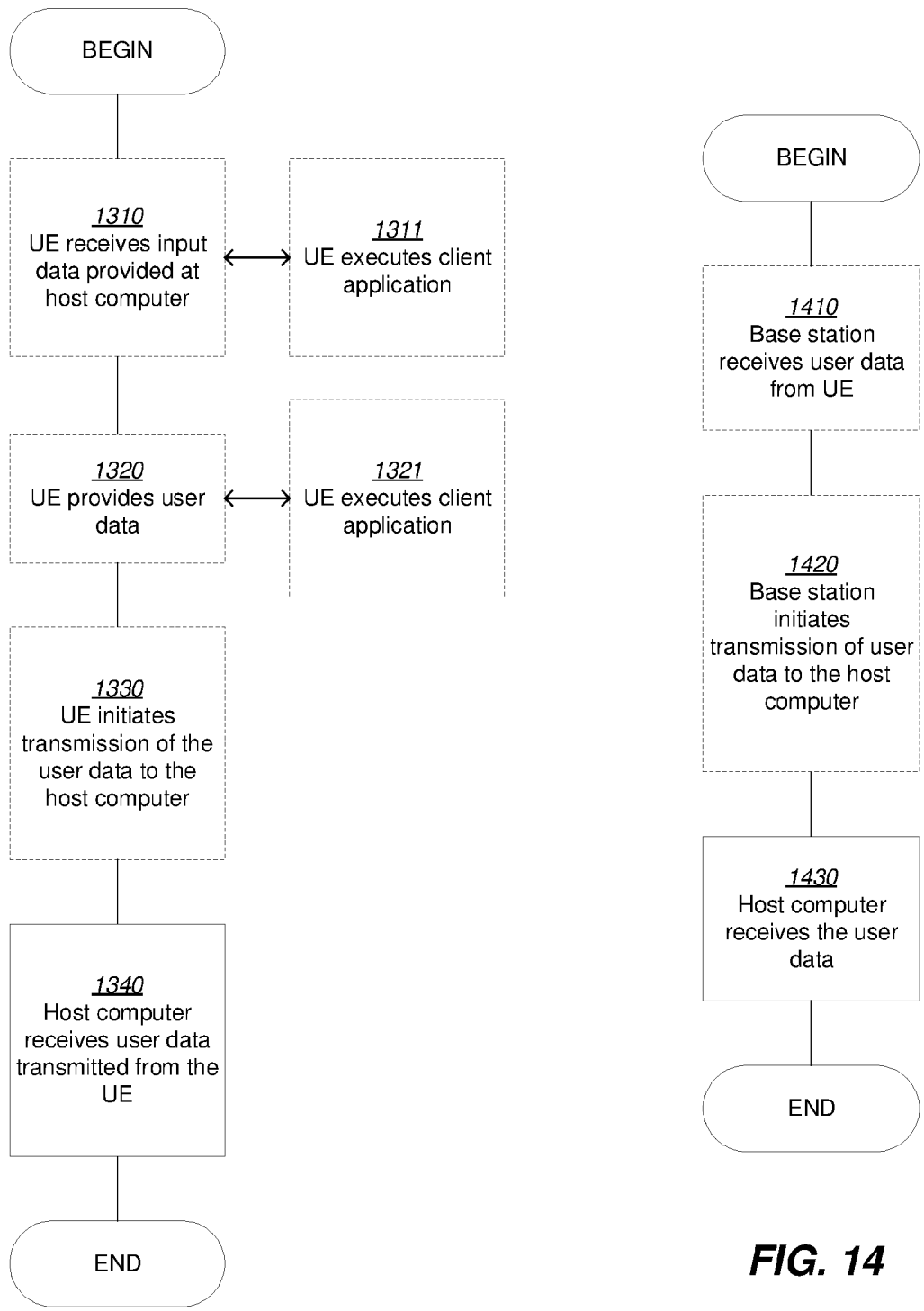

BACK-OFF FOR 2-STEP RA PROCEDURE

TECHNICAL FIELD

The present disclosure generally relates to the field of wireless network communications, and more particularly, to performing 2-step and 4-step random access (RA) procedures.

BACKGROUND

The legacy 4-step Random Access (RA) procedure, shown in FIG. 1, is the baseline for both Long Term Evolution (LTE) and 5G or New Radio (NR). In this procedure, the user equipment (UE) randomly selects a preamble and transmits it. When the eNB detects the preamble, it estimates the Timing Alignment (TA) that the UE should use in order to obtain uplink synchronization at the eNB. The eNB responds with the TA and a grant for Message 3 (msg3). In msg3, the UE transmits its identifier (ID), and the eNB responds by acknowledging the UE ID in msg4. The msg4 gives contention resolution, i.e., only one UE's ID will be sent, even if several UEs have used the same preamble (and msg3) simultaneously.

A medium access control (MAC) protocol data unit (PDU) for RA Response (RAR or msg2) consists of one or more MAC subPDUs and optional padding. Each MAC subPDU consists of one of the following: a MAC subheader with Backoff Indicator (BI) only; a MAC subheader with a RA preamble ID (RAPID) only (i.e., acknowledgment for system information (SI) request) and a MAC subheader with a RAPID and a MAC RAR. FIG. 2 shows an example of a MAC PDU that includes MAC RARs.

The gNB may signal back off in the RAR. A MAC subheader with a BI consists of five header fields E/T/R/R/BI as shown in FIG. 3A (from FIG. 6.1.5-1 of 3GPP TS 38.321). A MAC subPDU with a BI only is placed at the beginning of the MAC PDU, if included. "MAC subPDU(s) with RAPID only" and "MAC subPDU(s) with RAPID and MAC RAR" can be placed anywhere between MAC subPDU with BI only (if any) and padding (if any). A MAC subheader with RAPID consists of three header fields E/T/RAPID as show in FIG. 3B (from FIG. 6.1.5-2 of TS 38.321). Padding is placed at the end of the MAC PDU if present. The presence and length of padding is implicit based on the transport block size and the size of MAC subPDUs.

For both subheaders, the fields have the following explanations. The Extension field "E" is a flag indicating if the MAC subPDU including whether or not this MAC subheader is the last MAC subPDU. The "E" field is set to "1" to indicate at least another MAC subPDU follows. The "E" field is set to "0" to indicate that the MAC subPDU including this MAC subheader is the last MAC subPDU in the MAC PDU. The Type field "T" is a flag indicating whether the MAC subheader contains a RAPID or BI. The "T" field is set to "0" to indicate the presence of a BI field in the subheader. The "T" field is set to "1" to indicate the presence of a RAPID field in the subheader. The Reserved bit "R" is set to "0" and the BI field identifies the overload condition in the cell. The size of the BI field is 4 bits. The RAPID field identifies the transmitted RA Preamble. The size of the RAPID field is 6 bits. If the RAPID in the MAC subheader of a MAC subPDU corresponds to one of the RA Preambles configured for a SI request, a MAC RAR is not included in the MAC subPDU.

If a UE receives a RAR with the E/T/R/R/BI MAC subheader but no "MAC subPDU(s) with RAPID and MAC RAR" with RAPID matching its preamble transmission, the UE will back-off for a random time between 0 and a time indicated by the BI field before making a new preamble transmission attempt, i.e., return to RA Resource selection (Section 5.1.2 in 38.321). Another MAC subheader is the "MAC subheader with RAPID only" used for acknowledgment for an SI request, as shown in FIG. 3B (also from 3GPP TS 38.321).

The 2-step RA procedure has much less latency than the ordinary 4-step RA procedure. In the 2-step RA procedure, shown by FIG. 4A, the preamble (transmitted on the physical random access channel, or PRACH) and a message corresponding to msg3 (transmitted on the physical uplink shared channel, or PUSCH) in the 4-step RA procedure are transmitted in the same or in two subsequent subframes. The first message in the 2-step RA procedure is denoted Message A (msgA).

Upon successful reception of msgA (i.e., both the preamble and msg3), the eNB will respond with a msgB, such as a TA (which by assumption should not be needed or just give very minor updates) and a msg4 for contention resolution. The second message in the 2-step RA procedure may be denoted Message B (msgB).

In the event that the UE does not receive a msgB, it would re-try with a new msgA, similar to the action taken by a UE that does not receive a RA response (RAR) in the 4-step RA procedure.

An issue that may occur when the gNB only detects the preamble from a UE, rather than the complete msgA. This may happen if the UE TA is bad, e.g., using TA=0 in a large cell or using an old TA. This may also happen if a transmission with an inaccurate TA value of another UE is interfering. Additionally, the preamble signal has higher detection probability than the normal data due to its design pattern, even when the UE has moved. A third reason that only the preamble is detected is that the transmission may be colliding with another UE that uses the same preamble but transmits a different msg3 part (preamble is detected but only one of the msg3 parts). In this case, the network may reply with an ordinary RAR, giving the UE an opportunity to transmit an ordinary msg3 on a scheduled resource. This is the fallback to a 4-step RA procedure. It should be noted that the exact UE behavior has not been specified for this case.

It is also possible fall back to a 4-step RA procedure by transmitting a new preamble indicating 4-step RA procedure. This preamble is either reserved for 4-step RA procedures or it is transmitted on PRACH resources reserved for 4-step RA procedures. This could be done, for example, after a configured number of failed 2-step RA preamble transmission attempts.

In the 2-step RA procedure, the back-off mechanism has not yet been agreed to in 3GPP. If the same MAC subheader is used as for the 4-step RA procedure, there is no possibility of indicating back-off specifically intended for only 2-step UEs. Since the RAR is addressed to (and read) by all UEs transmitting on a certain PRACH resource, which may be shared by both 2-step and 4-step UEs, all 2-step and 4-step UEs will back off. This is undesirable behavior since the reason for back-off may be congestion on RACH resources (both PRACH and PUSCH) or gNB processing of 2-step UEs only (or of 4-step only). Therefore, it is not good if both 2-step and 4-step UEs back off if the back-off is only needed or intended for 2-step UEs.

A second problem with the back-off for the 2-step RA procedure is that, according to the legacy 4-step RA procedure, the UE will continue to monitor for a RAR, within the RAR window, for a RAR which contains a MAC subPDU with RAPID corresponding to the transmitted PREAMBLE_INDEX. In the 4-step RA procedure, if such a RAR is received, the UE can transmit msg3 and ignore the back-off. For the 2-step RA procedure, if such a RAR is received, the UE falls back to a 4-step RA procedure by transmitting a msg3 and ignores the back-off. However, in the 2-step RA procedure, there may be a msgB window that may be longer than the RAR window, and a msgB could come within this msgB window even after the RAR window has expired. This implies that a UE could back off when the RAR window expires, even though a msgB is on its way if the back-off is executed upon RAR window expiration. This is unwanted behavior.

SUMMARY

To alleviate the shortcomings described above, a mechanism is provided similar to the 4-step RA procedure back-off, but using a MAC control element (CE) BI specific to the 2-step RA procedure. That is, embodiments described here may define an E/T/R/R/BI MAC subheader, or E/T/RAPID MAC subheader with some reserved RAPID to indicate back-off.

Because a back-off may be a result of load/collisions on 2-step RA resources specifically, or radio resource quality issues for the PUSCH part (msgA PUSCH), UEs may be instructed to retry as a fallback to 4-step RA procedures for UEs doing 2-step RA and receiving the back-off MAC CE. It can be expected that due to the 2-step RA payload size, the radio resources and associated link quality required for a target success rate at cell edge is different from that of 4-step RACH.

In summary, it would be beneficial to allow the network to: order 2-step RA UEs to back-off without impact on 4-step UEs; order 2-step RA UEs to fallback to start 4-step procedure by transmitting a new preamble and/or order 2-step RA UEs to back-off and do fallback to start 4-step procedure by transmitting a new preamble.

Using a MAC CE based on the 4-step BI MAC CE, the additional action at the UE could be made by defining a use of the current "R" bits in the E/T/R/R/BI MAC subheader, while using a similar table for back-off time as defined. This subheader may be placed last in the MAC PDU so as not to interfere legacy UEs. Additionally, 2-step UEs must ignore legacy back-off indications.

In some embodiments, a 2-step RA specific MAC CE may be introduced in which the UE can be ordered to back-off using 2-step RA or fallback and/or using 4-step RA. In some embodiments, the E/T/R/R/BI MAC subheader is modified (using its R-bits) to introduce a back-off to UEs which transmitted msgA. In some embodiments, the UE that transmitted msgA shall ignore any subsequent legacy E/T/R/R/BI MAC subheader.

In some embodiments, the 2-step back-off is executed when both the RAR window and the msgB window have expired. FIG. 4B illustrates execution of 2-step back-off when both the RAR window and the msgB window have expired.

Embodiments of the present invention enable a mechanism for using the E/T/R/R/BI MAC subheader or the E/T/RAPID MAC subheader to indicate back-off and/or fallback to a 4-step RA procedure for UEs doing a 2-step RA procedure. The embodiments enable the network to order 2-step RA UEs to back off and fall back to start a 4-step RA procedure by transmitting a new preamble.

According to some embodiments, a method, in a wireless device configured to perform a 2-step RA procedure, includes transmitting a message according to the 2-step RA procedure, the message comprising a first RA preamble. The method also includes receiving, during a RA response window following the transmitting of the message, a MAC subheader and using one or more bits or fields included in the received MAC subheader to determine that the wireless device should take an action. The action may be according to any one of the following: backing off, according to a back-off parameter, for a subsequent RA attempt according to the 2-step RA procedure, wherein backing off comprises waiting for a random time between zero and a time indicated by the back-off parameter before a new transmission of a random access parameter; falling back to a 4-step RA procedure by transmitting a new RA preamble; and falling back to a 4-step RA procedure after backing off according to a back-off parameter, by transmitting a new RA preamble after the back-off.

According to some embodiments, a method, in access node configured to 2-step RA procedures and 4-step RA procedures with wireless devices, includes receiving a RA preamble and transmitting, in response to the RA preamble, a MAC subheader. The MAC subheader includes one or more bits or fields indicating that a wireless device utilizing a 2-step RA procedure should take action. The method also includes setting values for one or more bits or fields included in the transmitted MAC subheader to indicate that the wireless device should take action. The action may be according to any one of the following: backing off, according to a back-off parameter, for a subsequent RA attempt according to the 2-step RA procedure; falling back to a 4-step RA procedure by transmitting a new random access preamble; and falling back to a 4-step RA procedure after backing off according to a back-off parameter, by transmitting a new random access preamble after the back-off.

Further aspects of the present invention are directed to an apparatus, network node, base station, wireless device, UE, network devices, MTC devices, computer program products or computer readable storage medium corresponding to the methods summarized above and functional implementations of the above-summarized apparatus and UE.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE DRAWINGS

FIGS. 11 to 14 are flowcharts illustrating example methods implemented in a communication system including a host computer, a base station and a user equipment.

DETAILED DESCRIPTION

Figure 1:
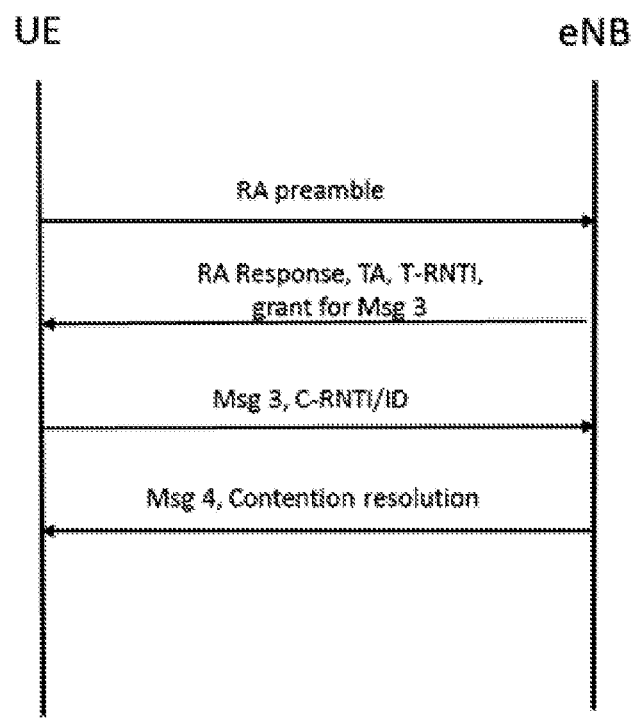
FIG. 1 illustrates a 4-step RACH procedure.
Figure 2:
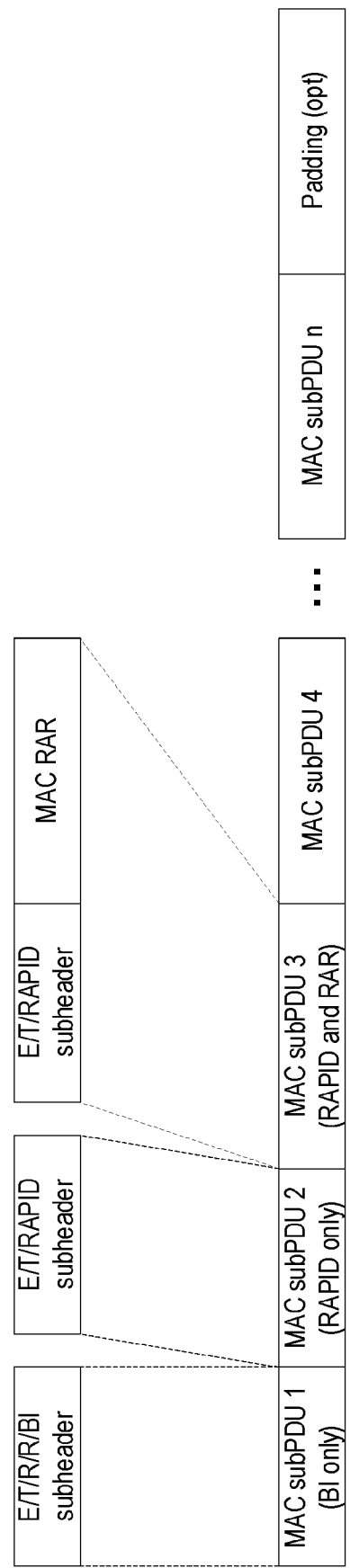
FIG. 2 illustrates an example of a MAC PDU consisting of MAC RARs.
Figure 3A:
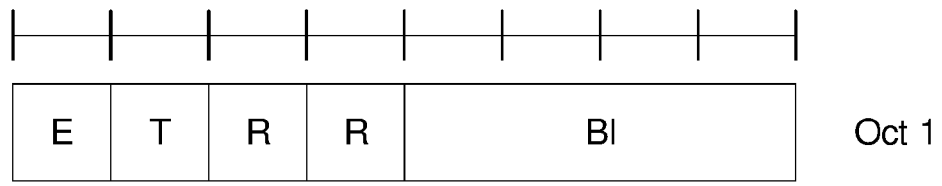
FIG. 3A illustrates an E/T/R/R/BI MAC subheader.
Figure 3B:
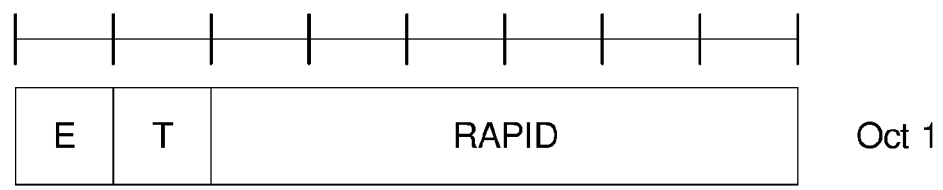
FIG. 3B illustrates an E/T/RAPID MAC subheader.
Figure 4A:
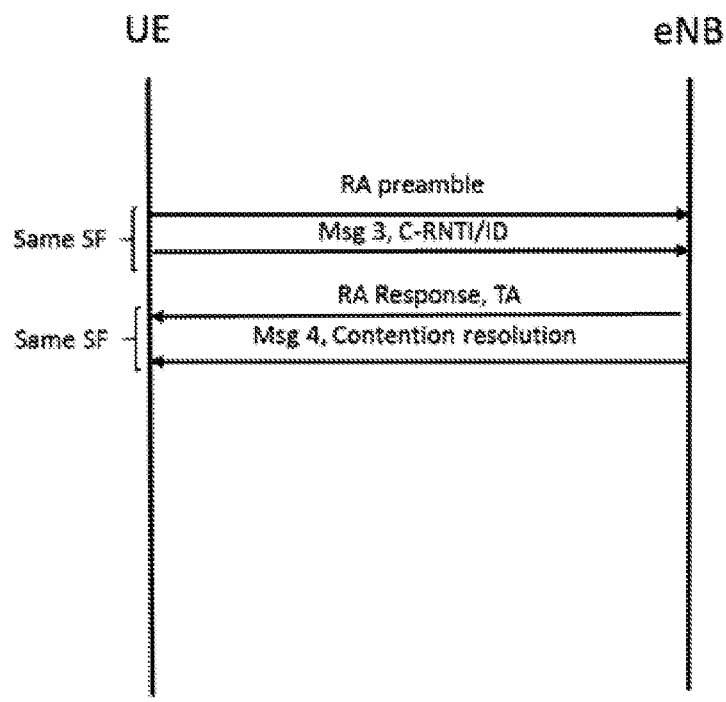
FIG. 4A illustrates a 2-step RACH procedure.
Figure 4B:
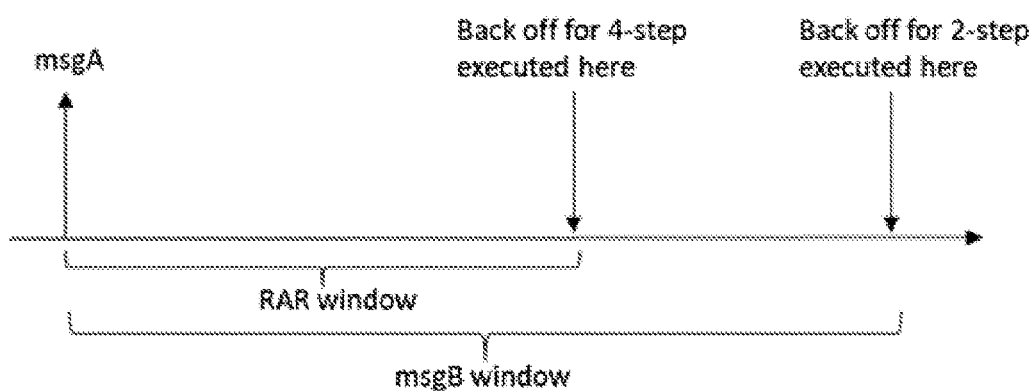
FIG. 4B illustrates a 2-step back-off when both the RAR window and the msgB window have expired.

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment. Any two or more embodiments described in this document may be combined with each other. The embodiments are described with respect to LTE, including LTE-M, but can be adapted in other radio access technologies (RATs) where the techniques or selections may be relevant.

In current Release 15, a gNB may signal back-off in the msg2 RAR, which entails the UE receiving a RAR with the E/T/R/R/BI MAC subheader but no "MAC subPDU(s) with RAPID and MAC RAR." With a RAPID matching its preamble transmission, the UE will back-off for a random time between 0 and a time indicated by the BI field before doing a new preamble transmission attempt, i.e., return to RA Resource selection. This is useful, for example, in load situations when a colliding UE competes for available PRACH resources.

With 2-step RACH, it can be assumed that a UE supports reception of a msg2. This may be due to supporting a fallback from a 2-step RA to a "legacy" 4-step RA procedure, or due to the gNB only receiving a preamble part, while not a 2-step msgA PUSCH part. The UE may thus decide to use a legacy RA procedure.

2-step specific backoff and fallback indicators may be used, in relation to a legacy 4-step procedure and a msg2 RAR BI. Embodiments described herein involve actions for UEs that have transmitted a msgA in the 2-step RA procedure upon receiving a RA response (RAR) with the E/T/R/R/BI or the E/T/RAPID MAC subheader.

According to a first approach, a UE, after transmitting the msgA in the 2-step RA procedure, receives an E/T/R/R/BI MAC subheader and uses values included in that subheader to determine that it should take action according to any one of the following: back-off, according to a BI indicated in the subheader, for a subsequent RA attempt according to the 2-step RA procedure; fall back to a 4-step RA procedure by transmitting a new preamble; and back off according to a BI indicated in the subheader and fall back to a 4-step RA procedure by transmitting a new preamble after the back off.

In some embodiments according to this approach, one "R-bit" in the E/T/R/R/BI MAC subheader may be used to indicate whether the UE should back off, according to the BI indicated in the subheader, while the other "R-bit" is used to indicate whether the UE should fall back to the 4-step RA procedure.

In some embodiments, after receiving an E/T/R/R/BI MAC subheader that indicates that the UE should back off according to a BI indicated in the subheader, the UE continues to monitor for RA responses until a RAR window expires, and the UE in these embodiments performs a subsequent RA attempt according to the BI only in the event that the UE does not receive a E/T/RAPID MAC subheader with a RAPID matching the preamble previously transmitted by the UE before expiry of the RAR window.

In some embodiments, after receiving an E/T/R/R/BI MAC subheader that indicates that the UE should back off according to a BI indicated in the subheader, the UE continues to monitor for a msgB in accordance with the 2-step RA procedure, until a msgB window expires, and the UE in these embodiments performs a subsequent RA attempt according to the BI only in the event that the UE does not receive a msgB responsive to the transmitted msgA, before expiry of the msgB window.

As a first example of this approach, the UE receives an E/T/R/R/BI MAC subheader with the first "R-bit" set to 1. This means that the UE does a back-off according to the BI indicated in the subheader and retries with a new 2-step preamble transmission. In more detail, this could be captured in 3GPP TS 38.321. For example, this can include setting the PREAMBLE_BACK-OFF to a value of the BI field of the MAC subPDU using Table 7.2-1 in 38.321, multiplied with SCALING_FACTOR_BI. The UE continues to monitor the PDCCH of the SpCell for RARs identified by the RA-RNTI while the ra-ResponseWindow is running. If no RAR is received that contains a MAC subPDU with a RA preamble ID (RAPID) corresponding to the transmitted PREAMBLE_INDEX before the ra-ResponseWindow expires, and if no msgB is received before the msgB window expires, the UE selects a random back-off time according to a uniform distribution between 0 and the PREAMBLE_BACK-OFF and the UE performs the RAR selection procedure for a 2-step RA procedure (see subclause 5.1.2) after the back-off time.

As a second embodiment, the UE receives an E/T/R/R/BI MAC subheader with the first "R-bit" set to 0 and the second R-bit set to "1". This means that the UE does a fallback to a 4-step RA procedure by retrying with a new 4-step preamble transmission. In more detail, this could be captured in 3GPP TS 38.321. For example, the UE continues to monitor the PDCCH of the SpCell for RARs identified by the RA-RNTI while the ra-ResponseWindow is running. If no RAR contains a MAC subPDU with a RAPID corresponding to the transmitted PREAMBLE_INDEX is received until the ra-ResponseWindow expires and if no msgB is received before the msgB window expires, the UE selects a random back-off time according to a uniform distribution between 0 and the PREAMBLE_BACK-OFF and performs the RAR selection procedure for a 4-step RA procedure (see subclause 5.1.2) after the back-off time.

As a third embodiment, the UE receives an E/T/R/R/BI MAC subheader with the first "R-bit" set to 1 and the second R-bit set to "1". This means that the UE backs off according to the BI indicated in the subheader and falls back to a 4-step RA procedure by retrying with a new 4-step preamble transmission. In more detail, this could be captured in 3GPP TS 38.321. For example, the UE sets the PREAMBLE_BACK-OFF to a value of the BI field of the MAC subPDU using Table 7.2-1 in 38.321, multiplied with SCALING_FACTOR_BI. The UE continues to monitor the PDCCH of the SpCell for RARs identified by the RA-RNTI while the ra-ResponseWindow is running. If no RAR is received that contains a MAC subPDU with a RAPID corresponding to the transmitted PREAMBLE_INDEX until the ra-ResponseWindow expires and if no msgB is received before the msgB window expires, the UE selects a random back-off time according to a uniform distribution between 0 and the PREAMBLE_BACK-OFF and performs the RAR selection procedure for a 4-step RA procedure (see subclause 5.1.2) after the back-off time. It should be understood that what is stated about "first" and "second" bit can be reversed, i.e., "first" bit is in fact "second" and so on.

According to a second approach, or fourth embodiment, the E/T/RAPID MAC subheader is used to indicate back-off and/or fallback for 2-step UEs. In this case, specific RAPIDs may be reserved to indicate specific UE actions, such as the three example standard implementations provided above, except where the BI is a predetermined value. In some examples, if a first reserved RAPID is used, the UE actions are performed according to the first embodiment. If a second reserved RAPID is used, the UE actions are performed according to the second embodiment. If a third reserved RAPID is used, the UE actions are performed according to a third embodiment. In this embodiment, the BI value is configured in system information.

According to some embodiments of this second approach, a UE, after transmitting the msgA in the 2-step RA procedure, receives an E/T/RAPID MAC subheader, and uses a value carried by the RAPID field in that subheader to determine that it should take action according to any one of the following: back off, according to a predetermined back-off parameter, for a subsequent RA attempt according to the 2-step RA procedure; fall back to a 4-step RA procedure by transmitting a new preamble; and back off according to a predetermined back-off parameter and fall back to a 4-step RA procedure by transmitting a new preamble after the back off. The predetermined back-off parameter may be configured as part of broadcasted system information, for example.

In some embodiments according to this approach, one reserved value for the RAPID field may be used to indicate that the UE should back off, according to a predetermined back-off parameter, while another reserved value for the RAPID field is used to indicate that the UE should fall back to the 4-step RA procedure Another reserved value for the RAPID field may be used to indicate that the UE should both fall back to the 4-step RA procedure and back off according to a predetermined back-off parameter.

In some embodiments, after receiving an E/T/RAPID MAC subheader that indicates that the UE should back off, the UE continues to monitor for RARs until a RAR window expires, and the UE in these embodiments performs a subsequent RA attempt according to the predetermined back-off parameter, only in the event that the UE does not receive an E/T/RAPID MAC subheader with a RAPID matching the preamble previously transmitted by the UE before expiry of the RAR window.

In some embodiments, after receiving an E/T/RAPID MAC subheader that indicates that the UE should back off, the UE continues to monitor for a msgB in accordance with the 2-step RA procedure, until a msgB window expires, and the UE in these embodiments performs a subsequent RA attempt according to the predetermined back-off parameter only in the event that the UE does not receive a msgB responsive to the transmitted msgA, before expiry of the msgB window.

As a fifth embodiment, the UE receives an E/T/R/R/BI MAC subheader with E-bit set to 0 and both R-bits set to 0. Upon receiving this the UE then parses the subsequent octet according to the first four embodiments.

As a sixth embodiment, the UE receives an E/T/RAPID MAC subheader with E-bit set to 0 and a RAPID being equal to a preamble corresponding to an SI request. Upon receiving this, the UE then parses the subsequent octet according to the first four embodiments.

As a seventh embodiment, the UE receives an E/T/RAPID MAC subheader with E-bit set to 0 and a RAPID not being equal to the transmitted PREAMBLE_INDEX and not being equal to the preamble corresponding to an SI request. Upon receiving this, the UE then parses the subsequent octet after the MAC RAR associated with the E/T/RAPID MAC subheader according to the first four embodiments.

Figure 5:
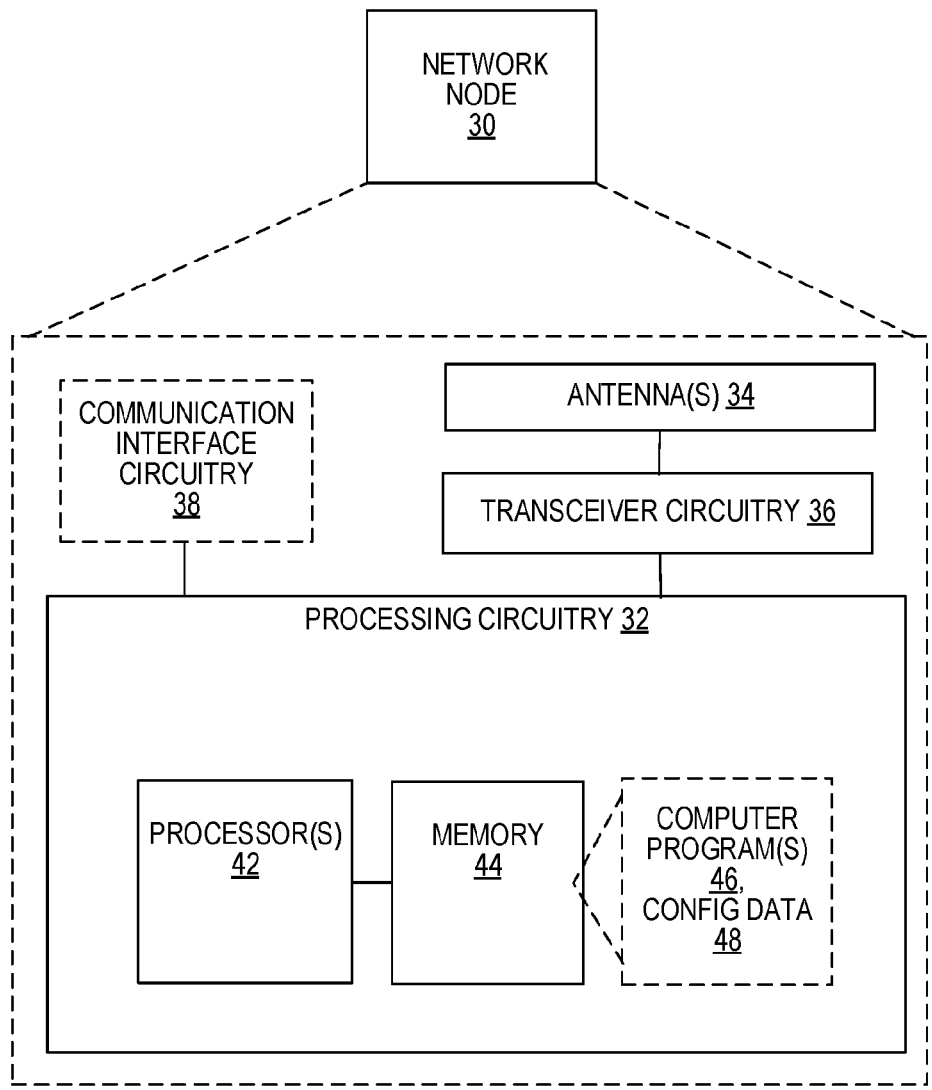
FIG. 5 illustrates is a block diagram of a network node, according to some embodiments.

FIG. 5 shows an example network node 30 that may be configured to carry out one or more of these disclosed techniques. Network node 30 may be an evolved Node B (eNodeB), Node B or gNB. While a network node 30 is shown in FIG. 5, the operations can be performed by other kinds of network access nodes, including a radio network node such as base station, radio base station, base transceiver station, base station controller, network controller, NR BS, Multi-cell/multicast Coordination Entity (MCE), relay node, access point, radio access point, Remote Radio Unit (RRU) Remote Radio Head (RRH), or a multi-standard BS (MSR BS). Network node 30 may also, in some cases, be a core network node (e.g., MME, SON node, a coordinating node, positioning node, MDT node, etc.), or even an external node (e.g., 3rd party node, a node external to the current network), etc. Network node 30 may also comprise test equipment.

In the non-limiting embodiments described below, network node 30 will be described as being configured to operate as a cellular network access node in an LTE network or NR network. In some embodiments, the technique can be implemented in the RRC layer. The RRC layer could be implemented by one or more network nodes in a cloud environment and hence some embodiments can be implemented in a cloud environment.

Those skilled in the art will readily appreciate how each type of node may be adapted to carry out one or more of the methods and signaling processes described herein, e.g., through the modification of and/or addition of appropriate program instructions for execution by processing circuits 32.

Network node 30 facilitates communication between wireless terminals (e.g., UEs), other network access nodes and/or the core network. Network node 30 may include communication interface circuitry 38 that includes circuitry for communicating with other nodes in the core network, radio nodes, and/or other types of nodes in the network for the purposes of providing data and/or cellular communication services. Network node 30 communicates with wireless devices using antennas 34 and transceiver circuitry 36. Transceiver circuitry 36 may include transmitter circuits, receiver circuits, and associated control circuits that are collectively configured to transmit and receive signals according to a radio access technology, for the purposes of providing cellular communication services.

Network node 30 also includes one or more processing circuits 32 that are operatively associated with the transceiver circuitry 36 and, in some cases, the communication interface circuitry 38. Processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 32 may comprise fixed circuitry, or programmable circuitry that is specially configured via the execution of program instructions implementing the functionality taught herein, or some mix of fixed and programmed circuitry. Processor 42 may be multi-core, i.e., having two or more processor cores utilized for enhanced performance, reduced power consumption, and more efficient simultaneous processing of multiple tasks.

Processing circuitry 32 also includes a memory 44. Memory 44, in some embodiments, stores one or more computer programs 46 and, optionally, configuration data 48. Memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, memory 44 comprises any one or more of SRAM, DRAM, EEPROM, and FLASH memory, which may be in processing circuitry 32 and/or separate from processing circuitry 32. Memory 44 may also store any configuration data 48 used by the network access node 30. Processing circuitry 32 may be configured, e.g., through the use of appropriate program code stored in memory 44, to carry out one or more of the methods and/or signaling processes detailed hereinafter.

Processing circuitry 32 of the network node 30 is configured, according to some embodiments, to perform 2-step RA procedures and 4-step RA procedures with wireless devices. Processing circuitry 32 is configured to receive a RA preamble and transmit, in response to the RA preamble, a MAC subheader. The MAC subheader includes one or more bits or fields indicating that a wireless device utilizing a 2-step RA procedure should take action. Processing circuitry 32 is also configured to set values for one or more bits or fields included in the transmitted MAC subheader to indicate that the wireless device should take action according to any one of the following: backing off, according to a back-off parameter, for a subsequent RA attempt according to the 2-step RA procedure; falling back to a 4-step RA procedure by transmitting a new random access preamble; and falling back to a 4-step RA procedure after backing off according to a back-off parameter, by transmitting a new preamble after the back-off.

Processing circuitry 32 is also configured to perform method 600, according to some embodiments. Method 600, shown in FIG. 6, includes receiving a random access preamble (block 602) and transmitting, in response to the random access preamble, a MAC subheader, the MAC subheader comprising one or more bits or fields indicating that a wireless device utilizing a 2-step RA procedure should take action (block 604). Method 600 also includes setting values for one or more bits or fields included in the transmitted MAC subheader to indicate that the wireless device should take action according to any one of the following: backing off, according to a back-off parameter, for a subsequent RA attempt according to the 2-step RA procedure; falling back to a 4-step RA procedure by transmitting a new random access preamble; and falling back to a 4-step RA procedure after backing off according to a back-off parameter, by transmitting a new preamble after the back-off (block 606).

The MAC subheader may be an E/T/R/R/BI MAC subheader and method 600 may include using one or more "R" bits in the E/T/R/R/BI MAC subheader to indicate an action to be taken by the wireless device using the 2-step RA procedure, and the back-off parameter may be a BI parameter included in the E/T/R/R/BI MAC subheader.

In some embodiments, method 60 includes setting a first "R" bit in the E/T/R/R/BI MAC subheader to "1" and setting a second bit in the E/T/R/R/BI MAC subheader to "0", to indicate that the wireless device is to back off according to the BI parameter for a subsequent RA attempt according to the 2-step RA procedure. In other embodiments, method 600 includes setting a first "R" bit in the E/T/R/R/BI MAC subheader to "0" and setting a second bit in the E/T/R/R/BI MAC subheader to "1", to indicate that the wireless device is to fall back to a 4-step RA procedure by transmitting the new RA preamble. In some embodiments, method 600 includes setting a first "R" bit in the E/T/R/R/BI MAC subheader to "1" and setting a second bit in the E/T/R/R/BI MAC subheader to "1", to indicate that the wireless device is to fall back to a 4-step RA procedure after backing off according to the BI parameter, by transmitting the new RA preamble.

The MAC subheader may be an E/T/RAPID MAC subheader, where the method may include using the RAPID field of the E/T/RAPID MAC subheader to indicate an action to be taken by the wireless device using the 2-step RA procedure, and the back-off parameter may be a predetermined back-off parameter. In this case, method 600 may include setting the RAPID field to a first predetermined value to indicate that the wireless device using the 2-step RA procedure is to back off according to the predetermined back-off parameter for a subsequent RA attempt according to the 2-step RA procedure. Method 600 may include setting the RAPID field to a second predetermined value to indicate that the wireless device using the 2-step RA procedure is to fall back to a 4-step RA procedure by transmitting the new RA preamble. Method 600 may include setting the RAPID field to a third predetermined value to indicate that the wireless device using the 2-step RA procedure is to fall back to a 4-step RA procedure after backing off according to the predetermined back-off parameter, by transmitting the new RA preamble. Method 600 may include broadcasting the predetermined back-off parameter as part of system information signaling.

Figure 7:
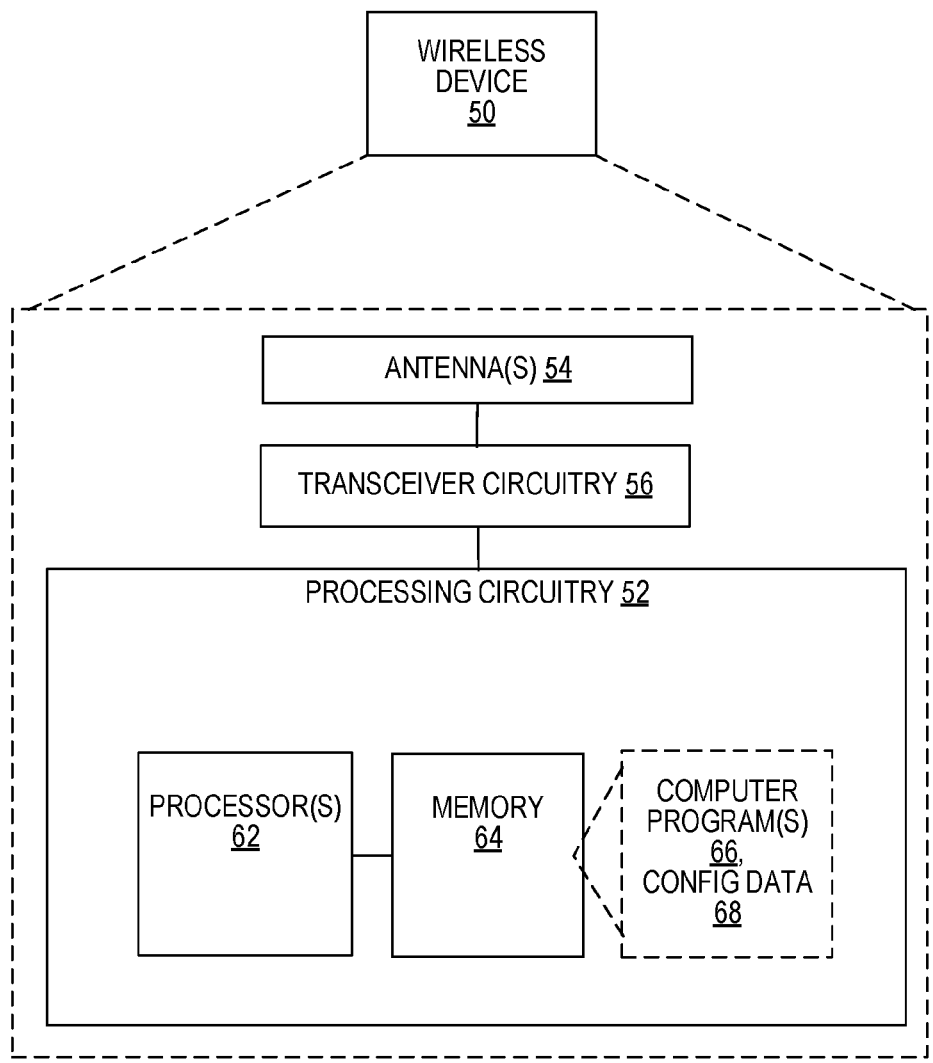
FIG. 7 illustrates is a block diagram of a wireless device, according to some embodiments.

FIG. 7 illustrates a diagram of a wireless device 50 configured to carry out the techniques described above for the wireless device 50, according to some embodiments. Wireless device 50 may be considered to represent any wireless devices or terminals that may operate in a network, such as a UE in a cellular network. Other examples may include a communication device, target device, MTC device, IoT device, device to device (D2D) UE, machine type UE or UE capable of machine to machine communication (M2M), a sensor equipped with UE, PDA (personal digital assistant), tablet, IPAD tablet, mobile terminal, smart phone, laptop embedded equipped (LEE), laptop mounted equipment (LME), USB dongles, Customer Premises Equipment (CPE), etc.

Wireless device 50 is configured to communicate with a network node or base station in a wide-area cellular network via antennas 54 and transceiver circuitry 56. Transceiver circuitry 56 may include transmitter circuits, receiver circuits, and associated control circuits that are collectively configured to transmit and receive signals according to a radio access technology, for the purposes of using cellular communication services.

Wireless device 50 also includes one or more processing circuits 52 that are operatively associated with the radio transceiver circuitry 56. Processing circuitry 52 comprises one or more digital processing circuits, e.g., one or more microprocessors, microcontrollers, DSPs, FPGAs, CPLDs, ASICs, or any mix thereof. More generally, processing circuitry 52 may comprise fixed circuitry, or programmable circuitry that is specially adapted via the execution of program instructions implementing the functionality taught herein, or may comprise some mix of fixed and programmed circuitry. Processing circuitry 52 may be multi-core.

Processing circuitry 52 also includes a memory 64. Memory 64, in some embodiments, stores one or more computer programs 66 and, optionally, configuration data 68. Memory 64 provides non-transitory storage for computer program 66 and it may comprise one or more types of computer-readable media, such as disk storage, solid-state memory storage, or any mix thereof. By way of non-limiting example, memory 64 comprises any one or more of SRAM, DRAM, EEPROM, and FLASH memory, which may be in processing circuitry 52 and/or separate from processing circuitry 52. Memory 64 may also store any configuration data 68 used by wireless device 50. Processing circuitry 52 may be configured, e.g., through the use of appropriate program code stored in memory 64, to carry out one or more of the methods and/or signaling processes detailed hereinafter.

Processing circuitry 52 of wireless device 50 is configured, according to some embodiments, to perform a 2-step RA procedure. Processing circuitry 52 is configured to transmit a msgA according to the 2-step RA procedure, the msgA comprising a first random access preamble, and receive, during a RAR window following the transmitting of the msgA, a MAC subheader. Processing circuitry 52 is configured to use one or more bits or fields included in the received MAC subheader to determine that the wireless device should take action according to any one of the following: backing off, according to a back-off parameter, for a subsequent RA attempt according to the 2-step RA procedure; falling back to a 4-step RA procedure by transmitting a new RA preamble; and falling back to a 4-step RA procedure after backing off according to a back-off parameter, by transmitting a new preamble after the back-off.

Figure 8:
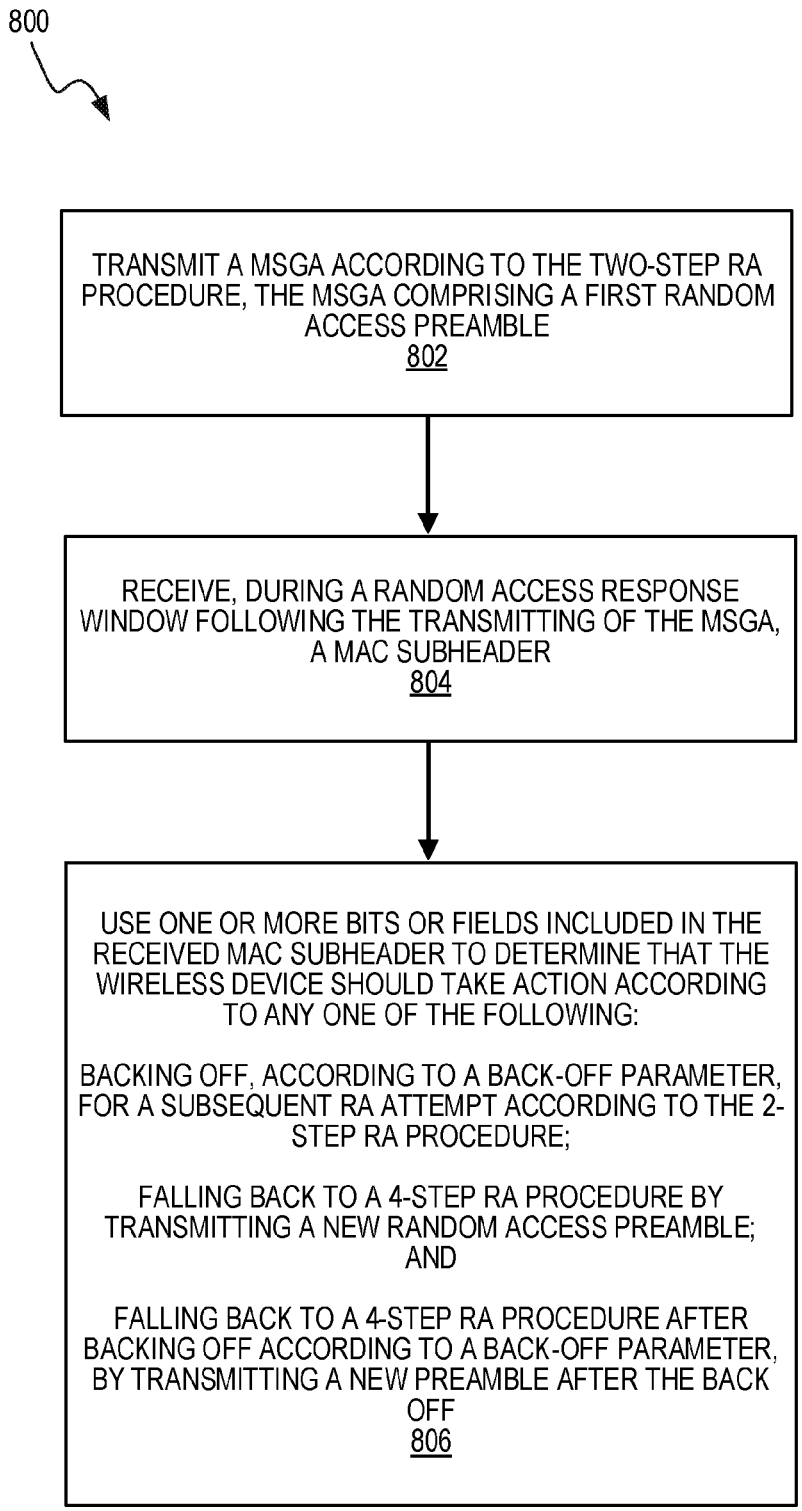
FIG. 8 illustrates is a flowchart illustrating a method in the wireless device, according to some embodiments.

Processing circuitry 52 may also be configured to perform method 800, shown in FIG. 8. Method 800 includes transmitting a message according to the 2-step RA procedure, the message comprising a first RA preamble (block 802). This message may be a msgA, according to the 2-step RA procedure. The method further comprises receiving, during a RAR window following the transmitting of the message, a MAC subheader (block 804). Method 800 includes using one or more bits or fields included in the received MAC subheader to determine that the wireless device should take action according to any one of the following: backing off, according to a back-off parameter, for a subsequent RA attempt according to the 2-step RA procedure; falling back to a 4-step RA procedure by transmitting a new RA preamble; and falling back to a 4-step RA procedure after backing off according to a back-off parameter, by transmitting a new RA preamble after the back-off (block 806).

The receiving may include receiving an E/T/R/R/BI MAC subheader and method 800 may include using one or more "R" bits in the E/T/R/R/BI MAC subheader to determine an action to take. The back-off parameter may be a B) parameter included in the E/T/R/R/BI MAC subheader. Method 800 may include determining that a first "R" bit in the E/T/R/R/BI MAC subheader is set to "1" and that a second "R" bit in the E/T/R/R/BI MAC subheader is set to "0," and method 800 may include, in response to the determining, backing off according to the BI parameter for a subsequent RA attempt according to the 2-step RA procedure. Method 800 may include determining that a first "R" bit in the E/T/R/R/BI MAC subheader is set to "0" and that a second "R" bit in the E/T/R/R/BI MAC subheader is set to "1," and, in response to the determining, falling back to a 4-step RA procedure by transmitting the new RA preamble. Method 800 may include determining that a first "R" bit in the E/T/R/R/BI MAC subheader is set to "1" and that a second "R" bit in the E/T/R/R/BI MAC subheader is set to "1," and, in response to said determining, falling back to a 4-step RA procedure after backing off according to the BI parameter, by transmitting the new random access preamble.

In some embodiments, the receiving includes receiving an E/T/RAPID MAC subheader, and method 800 includes using the RAPID field of the E/T/RAPID MAC subheader to determine an action to take. The back-off parameter may be a predetermined back-off parameter. In some embodiments, method 800 includes determining that the RAPID field is set to a first predetermined value, and in response to the determining, backing off according to the predetermined back-off parameter for a subsequent RA attempt according to the 2-step RA procedure. In other embodiments, method 800 includes determining that the RAPID field is set to a first predetermined value, and in response to the determining, falling back to a 4-step RA procedure by transmitting the new random access preamble. In some embodiments, method 800 include determining that the RAPID field is set to a first predetermined value, and in response to the determining, falling back to a 4-step RA procedure after backing off according to the predetermined back-off parameter, by transmitting the new RA preamble. Method 800 may include receiving the predetermined back-off parameter via system information signaling.

Method 800 may include, after receiving the MAC subheader, continuing to monitor for RARs until a random access response window expires and conditioning the backing off and/or falling back on not receiving an E/T/RAPID MAC subheader with a RAPID matching the preamble previously transmitted by the UE before expiry of the RAR window.

Method 800 may include, after receiving the MAC subheader, continuing to monitor for a msgB response according to the 2-step RA procedure until a msgB window expires and conditioning the backing off and/or falling back on not receiving a msgB response according to the 2-step RA procedure before expiry of the msgB window.

Figure 9:
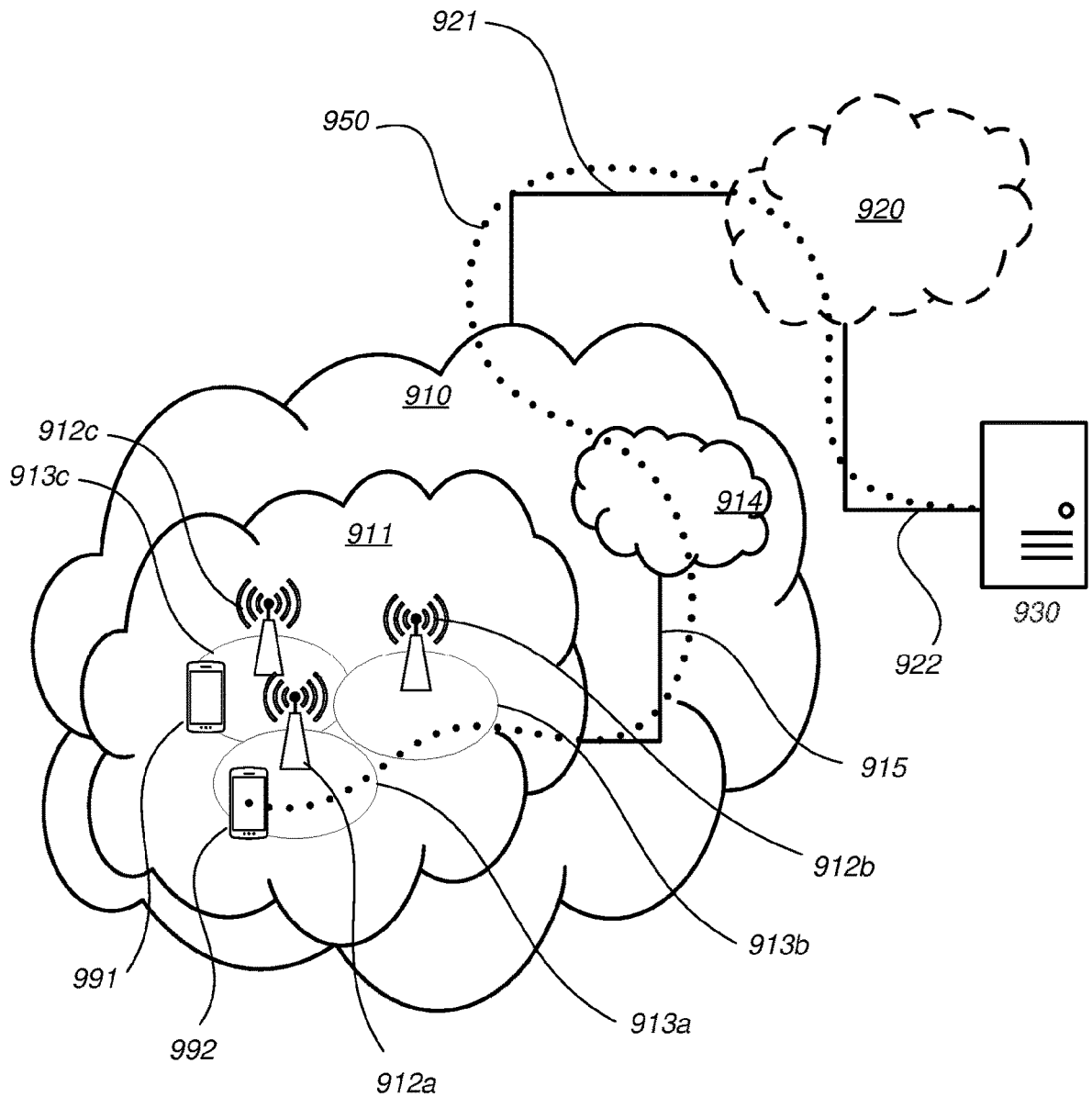
FIG. 9 schematically illustrates a telecommunication network connected via an intermediate network to a host computer, according to some embodiments.

FIG. 9, according to some embodiments, illustrates a communication system that includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 971 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. The connections 921, 922 between the telecommunication network 910 and the host computer 930 may extend directly from the core network 914 to the host computer 930 or may go via an optional intermediate network 920. The intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between one of the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, a base station 912 may not or need not be informed about the past routing of an incoming downlink communication with data originating from a host computer 930 to be forwarded (e.g., handed over) to a connected UE 991. Similarly, the base station 912 need not be aware of the future routing of an outgoing uplink communication originating from the UE 991 towards the host computer 930.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as a UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with a UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

Figure 10:
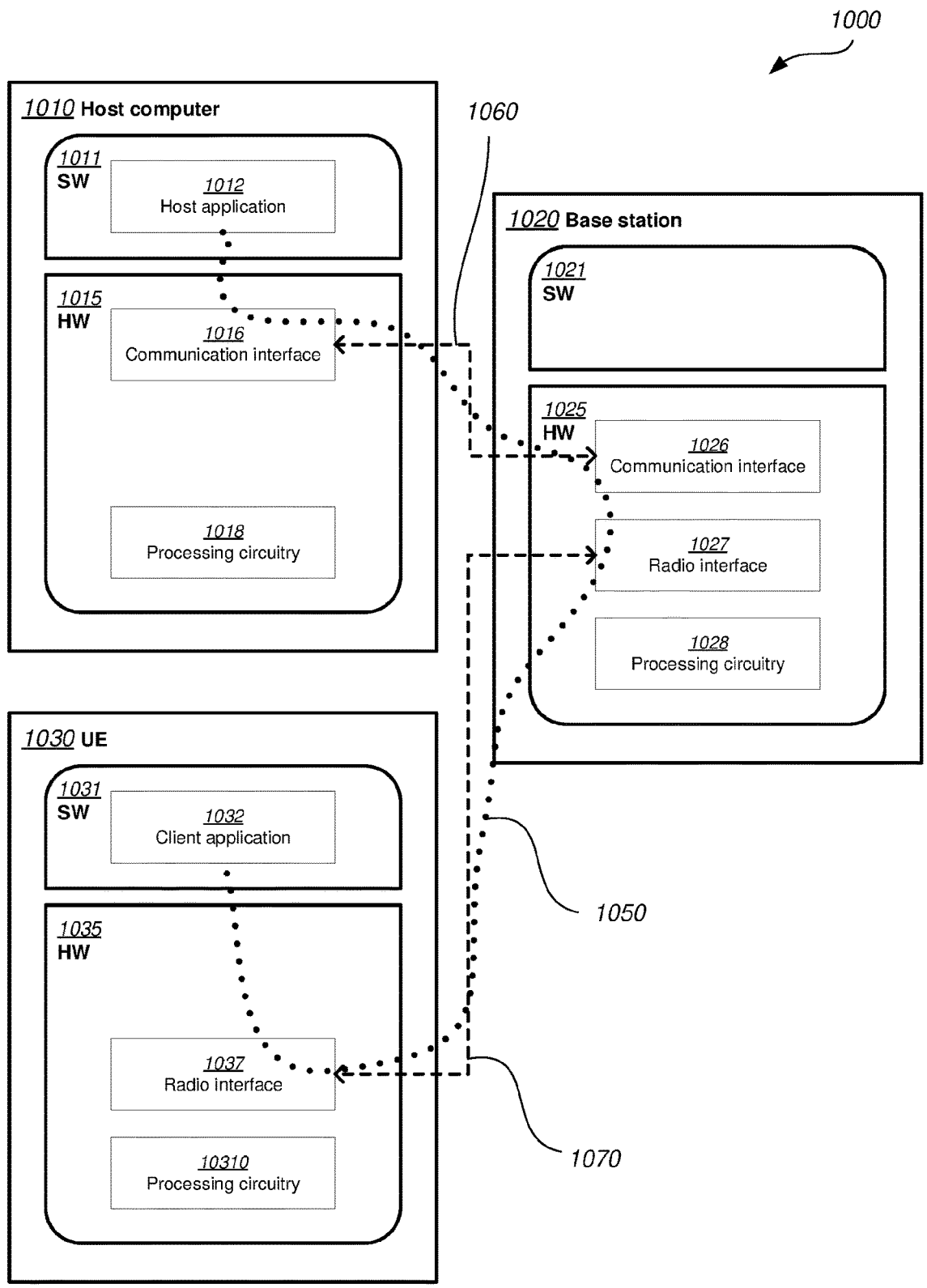
FIG. 10 is a generalized block diagram of a host computer communicating via a base station with a user equipment over a partially wireless connection, according to some embodiments.

It is noted that the host computer 1010, base station 1020 and UE 1030 illustrated in FIG. 10 may be identical to the host computer 1030, one of the base stations 1012a, 1012b, 1012c and one of the UEs 1091, 1092 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the use equipment 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

The wireless connection 1070 between the UE 1030 and the base station 1020 is in accordance with the teachings of the embodiments described throughout this disclosure, such as provided by nodes such as wireless device 50 and network node 30, along with the corresponding methods 600 and 800. The embodiments described herein enable a mechanism for using the E/T/R/R/BI mac subheader or the E/T/RAPID MAC subheader to indicate back-off and or fallback to 4-step RA for UEs doing 2-step RA. This alleviates problems that occur when both 2-step and 4-step UEs back off if the back-off is only needed for 2-step UEs and when a UE backs off when the RAR window expires, even though a msgB is on its way. The teachings of these embodiments may improve the reliability, connections, data rate, capacity, latency and/or power consumption for the network and UE 1030 using the OTT connection 1050.

A measurement procedure may be provided for the purpose of monitoring data rate, latency and other factors on which the one or more embodiments improve. There may further be an optional network functionality for reconfiguring the OTT connection 1050 between the host computer 1010 and UE 1030, in response to variations in the measurement results. The measurement procedure and/or the network functionality for reconfiguring the OTT connection 1050 may be implemented in the software 1011 of the host computer 1010 or in the software 1031 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer's 1010 measurements of throughput, propagation times, latency and the like. The measurements may be implemented in that the software 1011, 1031 causes messages to be transmitted, in particular empty or 'dummy' messages, using the OTT connection 1050 while it monitors propagation times, errors etc.

Figure 11:
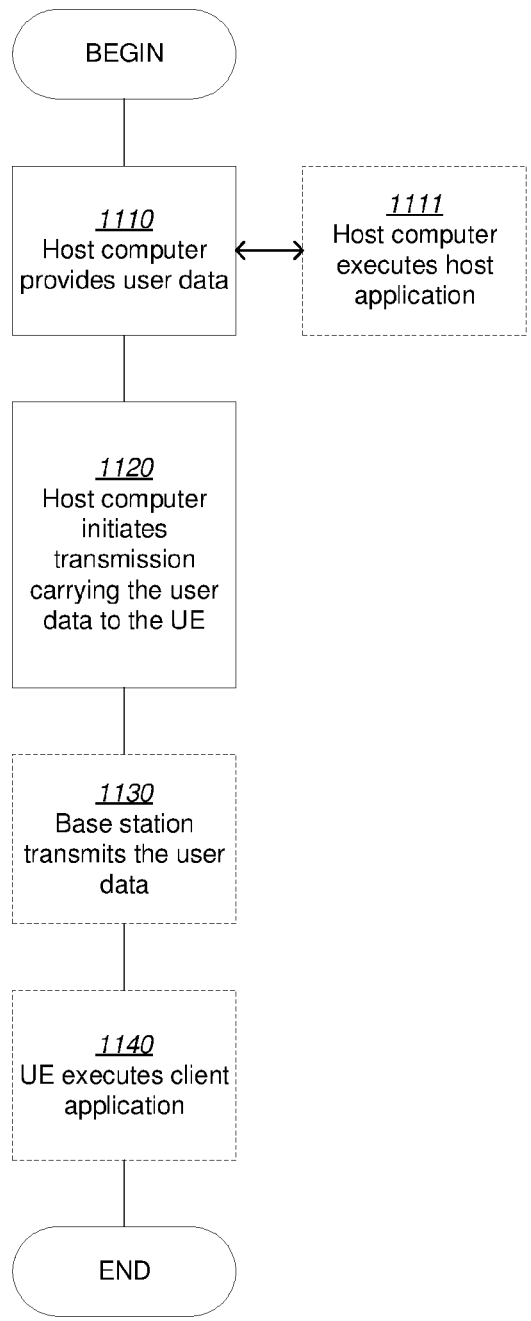

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In a first step 1110 of the method, the host computer provides user data. In an optional substep 1111 of the first step 1110, the host computer provides the user data by executing a host application. In a second step 1120, the host computer initiates a transmission carrying the user data to the UE. In an optional third step 1130, the base station transmits to the UE the user data which was carried in the transmission that the host computer initiated, in accordance with the teachings of the embodiments described throughout this disclosure. In an optional fourth step 1240, the UE executes a client application associated with the host application executed by the host computer.

Figure 12:
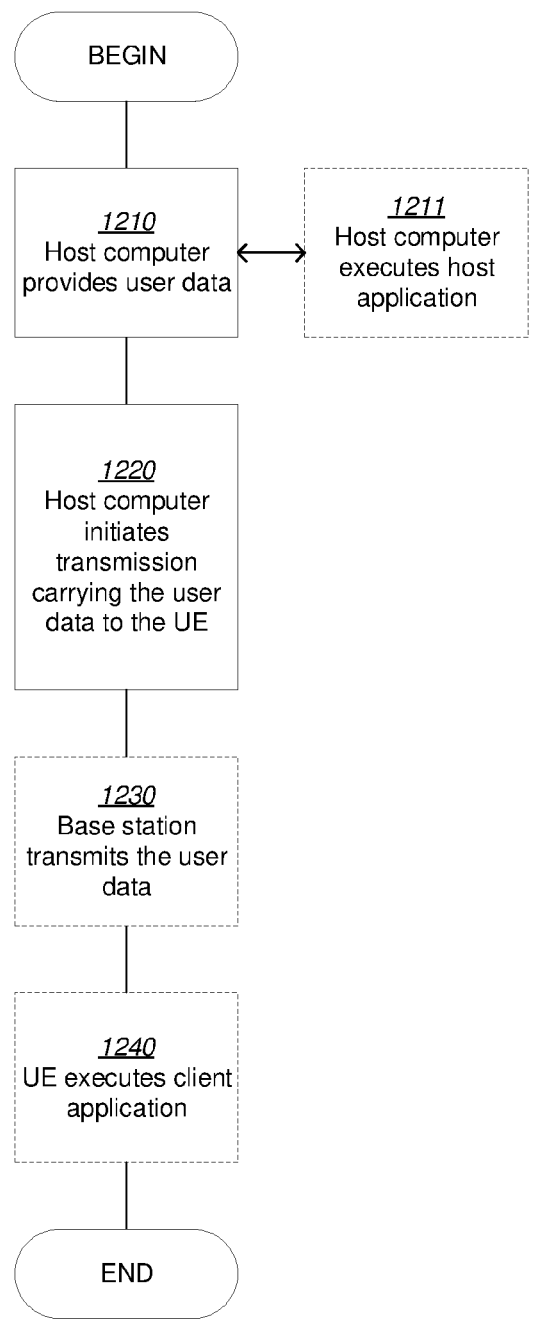

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In a first step 1210 of the method, the host computer provides user data. In an optional substep (not shown) the host computer provides the user data by executing a host application. In a second step 1220, the host computer initiates a transmission carrying the user data to the UE. The transmission may pass via the base station, in accordance with the teachings of the embodiments described throughout this disclosure. In an optional third step 1230, the UE receives the user data carried in the transmission.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In an optional first step 1310 of the method, the UE receives input data provided by the host computer. Additionally, or alternatively, in an optional second step 1320, the UE provides user data. In an optional substep 1321 of the second step 1320, the UE provides the user data by executing a client application. In a further optional substep 1311 of the first step 1310, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1330, transmission of the user data to the host computer. In a fourth step 1340 of the method, the host computer receives the user data transmitted from the UE, in accordance with the teachings of the embodiments described throughout this disclosure.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In an optional first step 1410 of the method, in accordance with the teachings of the embodiments described throughout this disclosure, the base station receives user data from the UE. In an optional second step 1420, the base station initiates transmission of the received user data to the host computer. In a third step 1430, the host computer receives the user data carried in the transmission initiated by the base station.

Figure 6:
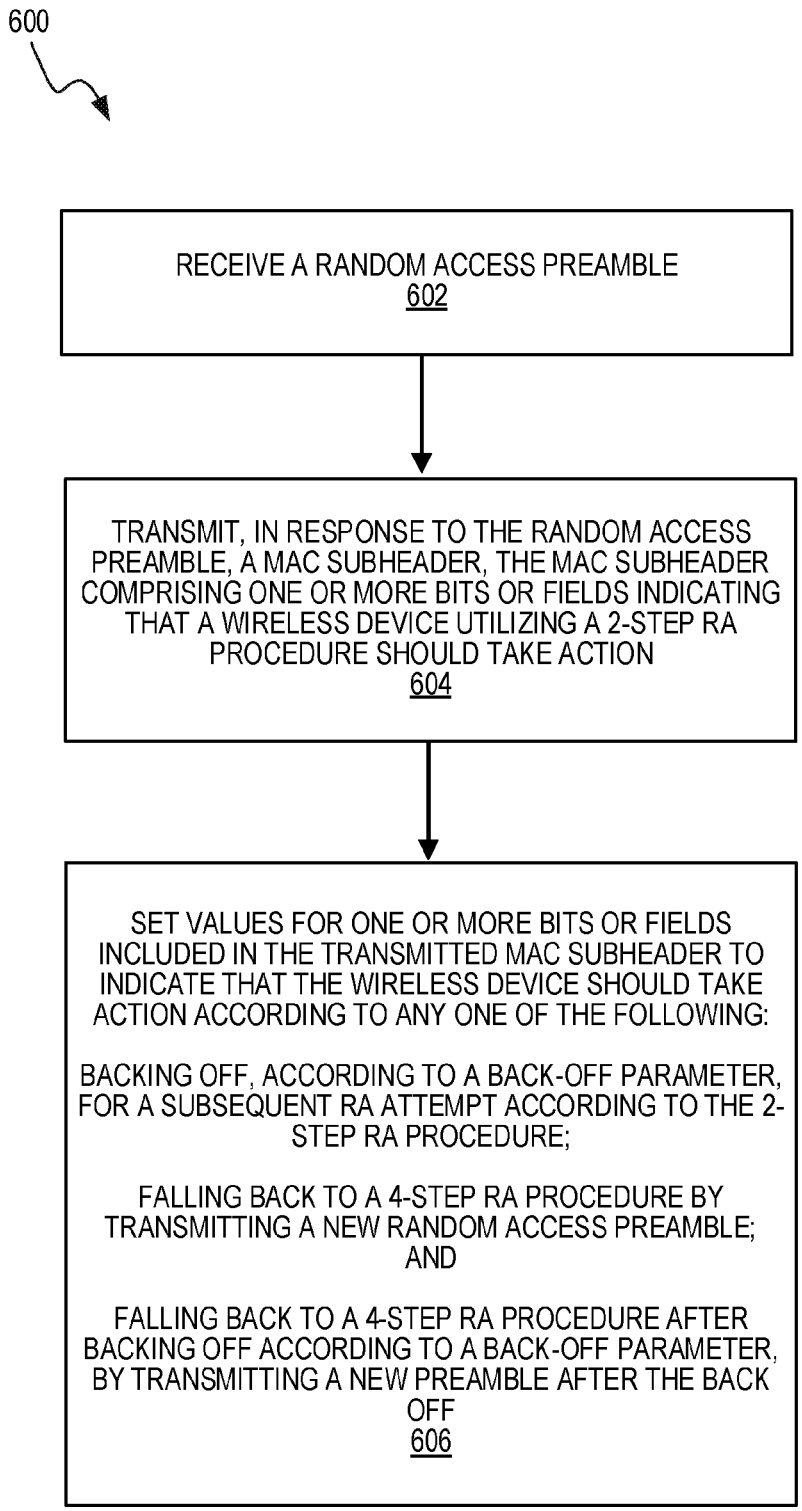
FIG. 6 illustrates a flowchart illustrating a method in the network node, according to some embodiments.

As discussed in detail above, the techniques described herein, e.g., as illustrated in the process flow diagrams of FIGS. 6 and 8, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 15:
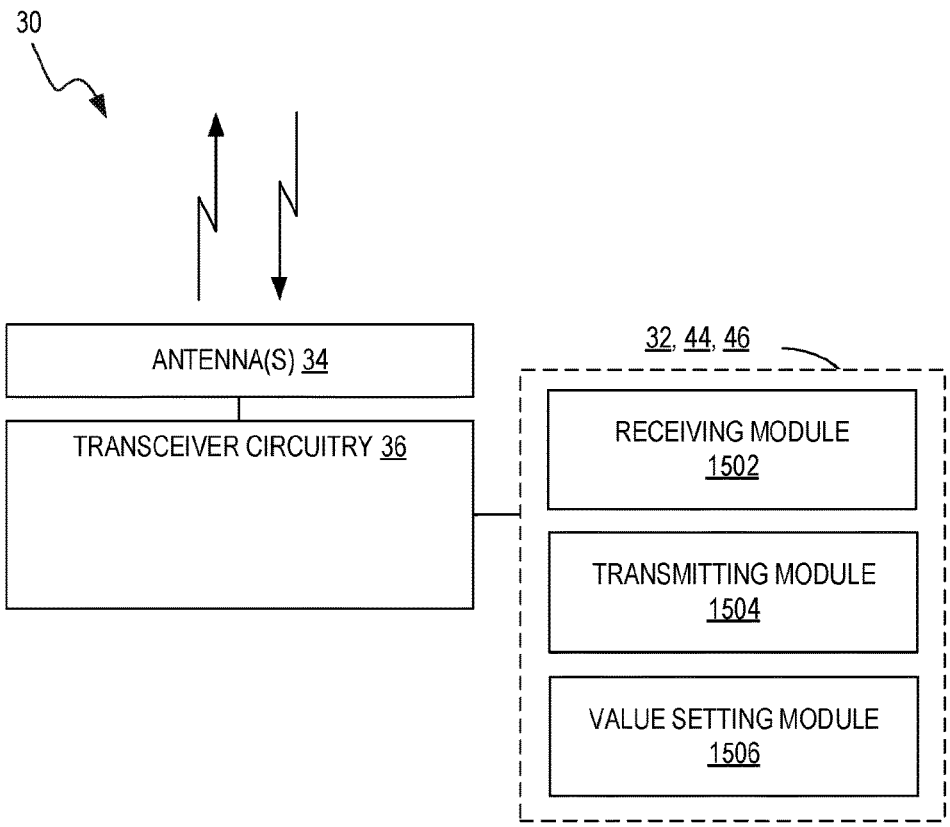
FIG. 15 is a block diagram illustrating a functional implementation of a network node, according to some embodiments.

FIG. 15 illustrates an example functional module or circuit architecture for a network node, such as network node 30. The functional implementation includes a receiving module 1502 for receiving a random access preamble and a transmitting module 1504 for transmitting, in response to the RA preamble, a MAC subheader, the MAC subheader comprising one or more bits or fields indicating that a wireless device utilizing a 2-step RA procedure should take action. The implementation also includes a value setting module 1506 for setting values for one or more bits or fields included in the received E/T/R/R/BI MAC subheader to indicate that the wireless device should take action according to any one of the following: backing off, according to a back-off parameter, for a subsequent RA attempt according to the 2-step RA procedure; falling back to a 4-step RA procedure by transmitting a new random access preamble; and falling back to a 4-step RA procedure after backing off according to a back-off parameter, by transmitting a new preamble after the back-off.

Figure 16:
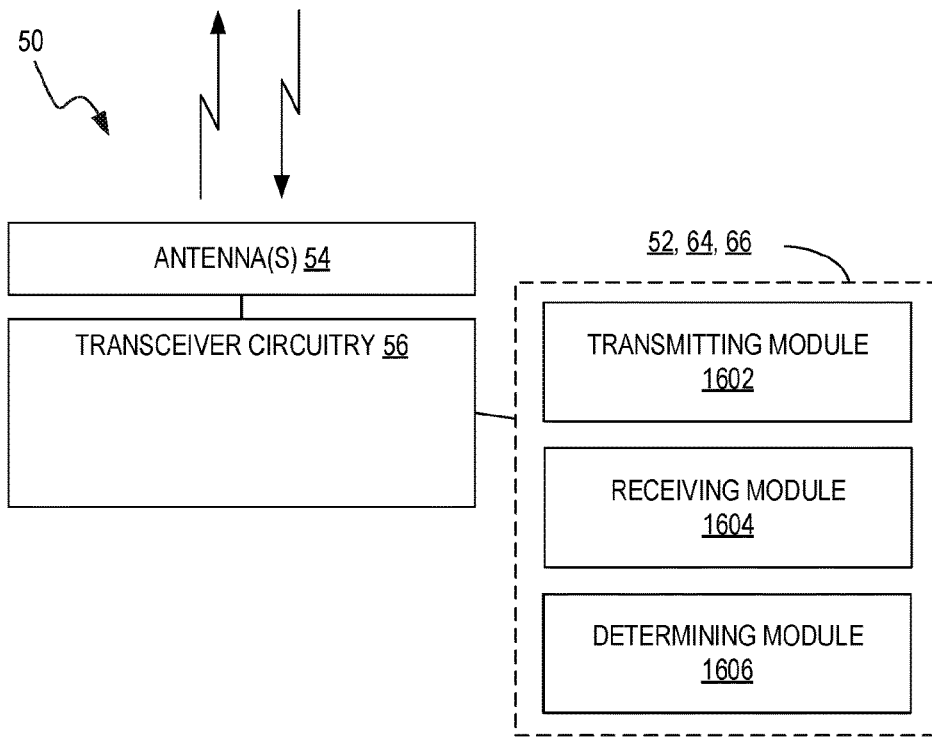
FIG. 16 is a block diagram illustrating a functional implementation of a wireless device, according to some embodiments.

FIG. 16 illustrates an example functional module or circuit architecture for wireless device 50 that includes a transmitting module 1602 for transmitting a msgA according to the 2-step RA procedure, the msgA comprising a first RA preamble and a receiving module 1604 for receiving, during a random access response window following the transmitting of the msgA, a MAC subheader. The implementation also includes a determining module 1606 for using one or more bits or fields included in the received E/T/R/R/BI MAC subheader to determine that the wireless device should take action according to any one of the following: backing off, according to a back-off parameter, for a subsequent RA attempt according to the 2-step RA procedure; falling back to a 4-step RA procedure by transmitting a new random access preamble; and falling back to a 4-step RA procedure after backing off according to a back-off parameter, by transmitting a new preamble after the back-off.

EXAMPLE EMBODIMENTS

Example embodiments can include, but are not limited to, the following enumerated examples:

1. A method, in a wireless device configured to perform a 2-step random access (RA) procedure, the method comprising:
   transmitting a msgA according to the 2-step RA procedure, the msgA comprising a first random access preamble;
   receiving, during a random access response window following the transmitting of the msgA, a MAC subheader; and
   using one or more bits or fields included in the received E/T/R/R/BI MAC subheader to determine that the wireless device should take action according to any one of the following:
     backing off, according to a back-off parameter, for a subsequent RA attempt according to the 2-step RA procedure;
     falling back to a 4-step RA procedure by transmitting a new random access preamble; and
     falling back to a 4-step RA procedure after backing off according to a back-off parameter, by transmitting a new preamble after the back-off.
2. The method of example embodiment 1, wherein said receiving comprises receiving an E/T/R/R/BI MAC subheader and wherein the method comprises using one or more "R" bits in the E/T/R/R/BI MAC subheader to determine an action to take, and wherein the back-off parameter is a back-off indicator (BI) parameter included in the E/T/R/R/BI MAC subheader.
3. The method of example embodiment 2, wherein the method comprises determining that a first "R" bit in the E/T/R/R/BI MAC subheader is set to "1" and that a second "R" bit in the E/T/R/R/BI MAC subheader is set to "0," and wherein the method comprises, in response to said determining, backing off according to the BI parameter for a subsequent RA attempt according to the 2-step RA procedure.
4. The method of example embodiment 2, wherein the method comprises determining that a first "R" bit in the E/T/R/R/BI MAC subheader is set to "0" and that a second "R" bit in the E/T/R/R/BI MAC subheader is set to "1," and wherein the method comprises, in response to said determining, falling back to a 4-step RA procedure by transmitting the new random access preamble.
5. The method of example embodiment 2, wherein the method comprises determining that a first "R" bit in the E/T/R/R/BI MAC subheader is set to "1" and that a second "R" bit in the E/T/R/R/BI MAC subheader is set to "1," and wherein the method comprises, in response to said determining, falling back to a 4-step RA procedure after backing off according to the BI parameter, by transmitting the new random access preamble.
6. The method of example embodiment 1, wherein said receiving comprises receiving an E/T/RAPID MAC subheader, wherein the method comprises using the RAPID field of the E/T/RAPID MAC subheader to determine an action to take, and wherein the back-off parameter is a predetermined back-off parameter.
7. The method of example embodiment 6, wherein the method comprises determining that the RAPID field is set to a first predetermined value, and wherein the method comprises, in response to said determining, backing off according to the predetermined back-off parameter for a subsequent RA attempt according to the 2-step RA procedure.
8. The method of example embodiment 6, wherein the method comprises determining that the RAPID field is set to a first predetermined value, and wherein the method comprises, in response to said determining, falling back to a 4-step RA procedure by transmitting the new random access preamble.
9. The method of example embodiment 6, wherein the method comprises determining that the RAPID field is set to a first predetermined value, and wherein the method comprises, in response to said determining, falling back to a 4-step RA procedure after backing off according to the predetermined back-off parameter, by transmitting the new random access preamble.
10. The method of any of example embodiments 6-9, wherein the method further comprises receiving the predetermined back-off parameter via system information signaling.
11. The method of any example embodiments 1-10, wherein the method further comprises:
    after receiving the MAC subheader, continuing to monitor for random access responses until a random access response window expires; and
    conditioning said backing off and/or falling back on not receiving an E/T/RAPID MAC subheader with a random access preamble identifier (RAPID) matching the preamble previously transmitted by the UE before expiry of the random access response window.

12. The method of any of example embodiments 1-11, wherein the method further comprises:
    after receiving the MAC subheader, continuing to monitor for a msgB response according to the 2-step RA procedure until a msgB window expires; and
    conditioning said backing off and/or falling back on not receiving a msgB response according to the 2-step RA procedure before expiry of the msgB window.
13. A method, in access node configured to 2-step random access (RA) procedures and 4-step RA procedures with wireless devices, the method comprising:
    receiving a random access preamble;
    transmitting, in response to the random access preamble, a MAC subheader, the MAC subheader comprising one or more bits or fields indicating that a wireless device utilizing a 2-step RA procedure should take action
    setting values for one or more bits or fields included in the received E/T/R/R/BI MAC subheader to indicate that the wireless device should take action according to any one of the following:
       backing off, according to a back-off parameter, for a subsequent RA attempt according to the 2-step RA procedure;
       falling back to a 4-step RA procedure by transmitting a new random access preamble; and
       falling back to a 4-step RA procedure after backing off according to a back-off parameter, by transmitting a new preamble after the back-off.
14. The method of example embodiment 13, wherein the MAC subheader is an E/T/R/R/BI MAC subheader and wherein the method comprises using one or more "R" bits in the E/T/R/R/BI MAC subheader to indicate an action to be taken by the wireless device using the 2-step RA procedure, and wherein the back-off parameter is a back-off indicator (BI) parameter included in the E/T/R/R/BI MAC subheader.
15. The method of example embodiment 14, wherein the method comprises setting a first "R" bit in the E/T/R/R/BI MAC subheader to "1" and setting a second bit in the E/T/R/R/BI MAC subheader to "0", to indicate that the wireless device is to back off according to the BI parameter for a subsequent RA attempt according to the 2-step RA procedure.
16. The method of example embodiment 14, wherein the method comprises setting a first "R" bit in the E/T/R/R/BI MAC subheader to "0" and setting a second bit in the E/T/R/R/BI MAC subheader to "1", to indicate that the wireless device is to fall back to a 4-step RA procedure by transmitting the new random access preamble.
17. The method of example embodiment 14, wherein the method comprises setting a first "R" bit in the E/T/R/R/BI MAC subheader to "1" and setting a second bit in the E/T/R/R/BI MAC subheader to "1", to indicate that the wireless device is to fall back to a 4-step RA procedure after backing off according to the BI parameter, by transmitting the new random access preamble.
18. The method of example embodiment 13, wherein the MAC subheader is an E/T/RAPID MAC subheader, wherein the method comprises using the RAPID field of the E/T/RAPID MAC subheader to indicate an action to be taken by the wireless device using the 2-step RA procedure, and wherein the back-off parameter is a predetermined back-off parameter.
19. The method of example embodiment 18, wherein the method comprises setting the RAPID field to a first predetermined value to indicate that the wireless device using the 2-step RA procedure is to back off according to the predetermined back-off parameter for a subsequent RA attempt according to the 2-step RA procedure.
20. The method of example embodiment 18, wherein the method comprises setting the RAPID field to a second predetermined value to indicate that the wireless device using the 2-step RA procedure is to fall back to a 4-step RA procedure by transmitting the new random access preamble.
21. The method of example embodiment 18, wherein the method comprises setting the RAPID field to a third predetermined value to indicate that the wireless device using the 2-step RA procedure is to fall back to a 4-step RA procedure after backing off according to the predetermined back-off parameter, by transmitting the new random access preamble.
22. The method of any of example embodiments 18-21, wherein the method further comprises broadcasting the predetermined back-off parameter as part of system information signaling.
23. A wireless device adapted to perform the methods of any of example embodiments 1-12.
24. A wireless device comprising transceiver circuitry and processing circuitry operatively associated with the transceiver circuitry and configured to perform the methods of any of example embodiments 1-12.
25. A network node adapted to perform the methods of any of example embodiments 13-22.
26. A network node comprising transceiver circuitry and processing circuitry operatively associated with the transceiver circuitry and configured to perform the methods of any of example embodiments 13-22.
27. A computer program comprising instructions that, when executed on at least one processing circuit, cause the at least one processing circuit to carry out the method according to any one of example embodiments 1-22.
28. A carrier containing the computer program of example embodiment 27, wherein the carrier is one of an electronic signal, optical signal, radio signal, or computer readable storage medium.
A1. A communication system including a host computer comprising:
    processing circuitry configured to provide user data; and
    a communication interface configured to forward the user data to a cellular network for transmission to a user equipment (UE), wherein the cellular network comprises a base station having a radio interface and processing circuitry, the base station's processing circuitry configured to perform any of the operations comprising embodiments 13-22.
A2. The communication system of the previous embodiment further including the base station.
A3. The communication system of the previous two embodiments, further including the UE, wherein the UE is configured to communicate with the base station.
A4. The communication system of the previous three embodiments, wherein:
    the processing circuitry of the host computer is configured to execute a host application, thereby providing the user data; and
    the UE comprises processing circuitry configured to execute a client application associated with the host application.

A5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of embodiments 13-22.

A6. The method of the previous embodiment, further comprising, at the base station, transmitting the user data.

A7. The method of the previous 2 embodiments, wherein the user data is provided at the host computer by executing a host application, the method further comprising, at the UE, executing a client application associated with the host application.

A8. A user equipment (UE) configured to communicate with a base station, the UE comprising a radio interface and processing circuitry configured to perform any of the previous 3 embodiments.

A9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of embodiments 1-12.

A10. The communication system of the previous embodiment, wherein the cellular network further includes a base station configured to communicate with the UE.

A11. The communication system of the previous 2 embodiments, wherein:
the processing circuitry of the host computer is configured to execute a host application, thereby providing the user data; and
the UE's processing circuitry is configured to execute a client application associated with the host application.

A12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of embodiments 1-12.

A13. The method of the previous embodiment, further comprising at the UE, receiving the user data from the base station.

A14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of embodiments 1-12.

A15. The communication system of the previous embodiment, further including the UE.

A16. The communication system of the previous 2 embodiments, further including the base station, wherein the base station comprises a radio interface configured to communicate with the UE and a communication interface configured to forward to the host computer the user data carried by a transmission from the UE to the base station.

A17. The communication system of the previous 3 embodiments, wherein:
the processing circuitry of the host computer is configured to execute a host application; and
the UE's processing circuitry is configured to execute a client application associated with the host application, thereby providing the user data.

A18. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

A19. A method implemented in a communication system including a host computer, a base station and a user equipment (UE), the method comprising:
at the host computer, receiving user data transmitted to the base station from the UE, wherein the UE performs any of the steps of any of embodiments 1-12.

A20. The method of the previous embodiment, further comprising, at the UE, providing the user data to the base station.

A21. The method of the previous 2 embodiments, further comprising:
at the UE, executing a client application, thereby providing the user data to be transmitted; and
at the host computer, executing a host application associated with the client application.

A22. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

A23. A communication system including a host computer comprising a communication interface configured to receive user data originating from a transmission from a User equipment (UE) to a base station, the base station comprising a radio interface and processing circuitry configured to communicate with the base station and cooperatively perform operations of any of embodiments 13-22.

A24. The communication system of the previous embodiment further including the base station.

A25. The communication system of the previous two embodiments, further including the UE, wherein the UE is configured to communicate with the base station.

A26. The communication system of the previous three embodiments, wherein:
the processing circuitry of the host computer is configured to execute a host application; and
the UE is further configured to execute a client application associated with the host application, thereby providing the user data to be received by the host computer.

A27. A method implemented in a communication system including a host computer, a base station and a user equipment (UE), the method comprising:
   at the host computer, receiving, from the base station, user data originating from a transmission which the base station has received from the UE, wherein the UE performs any of the steps of any of embodiments 1-12.

A28. The method of the previous embodiment, further comprising at the base station, receiving the user data from the UE.

A29. The method of the previous 2 embodiments, further comprising at the base station, initiating a transmission of the received user data to the host computer.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

What is claimed is:

1. A method, in a wireless device configured to perform a 2-step random access (RA) procedure, the method comprising:
   transmitting a message according to the 2-step RA procedure, the message comprising a first random access preamble;
   receiving, during a random access response window following the transmitting of the message, a Medium Access Control (MAC) subheader; and
   using one or more bits or fields included in the received MAC subheader, selecting from among the following, for subsequent action:
      backing off, according to a back-off parameter, for a subsequent RA attempt according to the 2-step RA procedure, wherein backing off comprises waiting for a random time between zero and a time indicated by the back-off parameter before a new transmission of a random access preamble; and
      falling back to a 4-step RA procedure by transmitting a new random access preamble; and
      falling back to a 4-step RA procedure after backing off according to a back-off parameter, by transmitting a new random access preamble after the back-off.

2. The method of claim 1, wherein said receiving comprises receiving a MAC subheader that includes the back-off parameter.

3. The method of claim 2, wherein said receiving comprises receiving an E/T/R/R/BI MAC subheader and wherein the method comprises using one or more "R" bits in the E/T/R/R/BI MAC subheader to determine an action to take, and wherein the back-off parameter is a back-off indicator (BI) parameter included in the E/T/R/R/BI MAC subheader.

4. The method of claim 3, wherein the method comprises determining that a first "R" bit in the E/T/R/R/BI MAC subheader is set to "1" and that a second "R" bit in the E/T/R/R/BI MAC subheader is set to "0," and wherein the method comprises, in response to said determining, backing off according to the BI parameter for a subsequent RA attempt according to the 2-step RA procedure.

5. The method of claim 3, wherein the method comprises determining that a first "R" bit in the E/T/R/R/BI MAC subheader is set to "0" and that a second "R" bit in the E/T/R/R/BI MAC subheader is set to "1," and wherein the method comprises, in response to said determining, falling back to a 4-step RA procedure by transmitting the new random access preamble.

6. The method of claim 3, wherein the method comprises determining that a first "R" bit in the E/T/R/R/BI MAC subheader is set to "1" and that a second "R" bit in the E/T/R/R/BI MAC subheader is set to "1," and wherein the method comprises, in response to said determining, falling back to a 4-step RA procedure after backing off according to the BI parameter, by transmitting the new random access preamble.

7. The method of claim 1, wherein said receiving comprises receiving an E/T/RAPID MAC subheader, wherein the method comprises using the random access preamble identifier (RAPID) field of the E/T/RAPID MAC subheader to determine an action to take, and wherein the back-off parameter is a predetermined back-off parameter.

8. The method of claim 7, wherein the method further comprises receiving the predetermined back-off parameter via system information signaling.

9. The method of claim 1, wherein the method further comprises:
   after receiving the MAC subheader, continuing to monitor for random access responses until a random access response window expires; and
   conditioning said backing off and/or falling back on not receiving an E/T/RAPID MAC subheader with a random access preamble identifier (RAPID) matching the preamble previously transmitted by the UE before expiry of the random access response window.

10. The method of claim 1, wherein the method further comprises:
   after receiving the MAC subheader, continuing to monitor for a response to the message until a window for monitoring for the response expires; and
   conditioning said backing off and/or falling back on not receiving a response after receiving the MAC subheader and before expiry of the window.

11. The method of claim 1, wherein the method further comprises:
   after receiving the MAC subheader, continuing to monitor for a msgB response according to the 2-step RA procedure until a msgB window expires; and
   conditioning said backing off and/or falling back on not receiving a msgB response according to the 2-step RA procedure before expiry of the msgB window.

12. A method, in an access node configured to perform 2-step random access (RA) procedures and 4-step RA procedures with wireless devices, the method comprising:
   receiving a random access preamble;
   transmitting, in response to the random access preamble, a Medium Access Control (MAC) subheader, the MAC subheader comprising one or more bits or fields indicating that a wireless device utilizing a 2-step RA procedure should take action;
   setting values for one or more bits or fields included in the transmitted MAC subheader to indicate which of the following that the wireless device should select, for subsequent action:

backing off, according to a back-off parameter, for a subsequent RA attempt according to the 2-step RA procedure, wherein backing off comprises waiting for a random time between zero and a time indicated by the back-off parameter before a new transmission of a random access preamble;

falling back to a 4-step RA procedure by transmitting a new random access preamble; and falling back to a 4-step RA procedure after backing off according to a back-off parameter, by transmitting a new random access preamble after the back-off.

13. The method of claim 12, wherein the MAC subheader includes the back-off parameter.

14. The method of claim 13, wherein the MAC subheader is an E/T/R/R/BI MAC subheader and wherein the method comprises using one or more "R" bits in the E/T/R/R/BI MAC subheader to indicate an action to be taken by the wireless device using the 2-step RA procedure, and wherein the back-off parameter is a back-off indicator (BI) parameter included in the E/T/R/R/BI MAC subheader.

15. The method of claim 14, wherein the method comprises setting a first "R" bit in the E/T/R/R/BI MAC subheader to "1" and setting a second bit in the E/T/R/R/BI MAC subheader to "0", to indicate that the wireless device is to back off according to the BI parameter for a subsequent RA attempt according to the 2-step RA procedure.

16. The method of claim 14, wherein the method comprises setting a first "R" bit in the E/T/R/R/BI MAC subheader to "0" and setting a second bit in the E/T/R/R/BI MAC subheader to "1", to indicate that the wireless device is to fall back to a 4-step RA procedure by transmitting the new random access preamble.

17. The method of claim 14, wherein the method comprises setting a first "R" bit in the E/T/R/R/BI MAC subheader to "1" and setting a second bit in the E/T/R/R/BI MAC subheader to "1", to indicate that the wireless device is to fall back to a 4-step RA procedure after backing off according to the BI parameter, by transmitting the new random access preamble.

18. The method of claim 12, wherein the MAC subheader is an E/T/RAPID MAC subheader, wherein the method comprises using the random access preamble identifier (RAPID) field of the E/T/RAPID MAC subheader to indicate an action to be taken by the wireless device using the 2-step RA procedure, and wherein the back-off parameter is a predetermined back-off parameter.

19. The method of claim 18, wherein the method further comprises broadcasting the predetermined back-off parameter as part of system information signaling.

20. A wireless device comprising:
transceiver circuitry; and
processing circuitry operatively associated with the transceiver circuitry and configured to:
  transmit a message according to a 2-step random access (RA) procedure, using the transceiver circuitry, the message comprising a first random access preamble;
  receive, using the transceiver circuitry, during a random access response window following the transmitting of the message, a Medium Access Control (MAC) subheader; and
  use one or more bits or fields included in the received MAC subheader to select from among the following, for subsequent action:
    backing off, according to a back-off parameter, for a subsequent RA attempt according to the 2-step RA procedure, wherein backing off comprises waiting for a random time between zero and a time indicated by the back-off parameter before a new transmission of a random access preamble;
    falling back to a 4-step RA procedure by transmitting a new random access preamble; and
    falling back to a 4-step RA procedure after backing off according to a back-off parameter, by transmitting a new random access preamble after the back-off.

21. The wireless device of claim 20, wherein the MAC subheader is a E/T/R/R/BI MAC subheader and wherein the processing circuitry is configured to use one or more "R" bits in the E/T/R/R/BI MAC subheader to determine an action to take, and wherein the back-off parameter is a back-off indicator (BI) parameter included in the E/T/R/R/BI MAC subheader.

22. The wireless device of claim 21, wherein the processing circuitry is configured to determine that a first "R" bit in the E/T/R/R/BI MAC subheader is set to "1" and that a second "R" bit in the E/T/R/R/BI MAC subheader is set to "0," and wherein the processing circuitry is further configured to, in response to said determining, back off according to the BI parameter for a subsequent RA attempt according to the 2-step RA procedure.

23. The wireless device of claim 21, wherein the processing circuitry is configured to determine that a first "R" bit in the E/T/R/R/BI MAC subheader is set to "0" and that a second "R" bit in the E/T/R/R/BI MAC subheader is set to "1," and wherein the processing circuitry is further configured to, in response to said determining, fall back to a 4-step RA procedure by transmitting the new random access preamble.

24. The wireless device of claim 21, wherein the processing circuitry is configured to determine that a first "R" bit in the E/T/R/R/BI MAC subheader is set to "1" and that a second "R" bit in the E/T/R/R/BI MAC subheader is set to "1," and wherein the processing circuitry is further configured to, in response to said determining, fall back to a 4-step RA procedure after backing off according to the BI parameter, by transmitting the new random access preamble.

25. The wireless device of claim 20, wherein the MAC subheader is an E/T/RAPID MAC subheader, wherein the processing circuitry is configured to use the random access preamble identifier (RAPID) field of the E/T/RAPID MAC subheader to determine an action to take, and wherein the back-off parameter is a predetermined back-off parameter.

26. A network node comprising:
transceiver circuitry; and
processing circuitry operatively associated with the transceiver circuitry and configured to:
  receive a random access (RA) preamble, using the transceiver circuitry;
  transmit, in response to the RA preamble and using the transceiver circuitry, a Medium Access Control (MAC) subheader, the MAC subheader comprising one or more bits or fields indicating that a wireless device utilizing a 2-step RA procedure should take action;
  set values for one or more bits or fields included in the transmitted MAC subheader to indicate which of the following that the wireless device should select, for subsequent action:
    backing off, according to a back-off parameter, for a subsequent RA attempt according to the 2-step RA procedure, wherein backing off comprises waiting for a random time between zero and a time indicated by the back-off parameter before a new transmission of a random access preamble;

falling back to a 4-step RA procedure by transmitting a new random access preamble; and falling back to a 4-step RA procedure after backing off according to a back-off parameter, by transmitting a new random access preamble after the back-off.

\* \* \* \* \*